(12) United States Patent
Sparks

(10) Patent No.: US 8,706,879 B2
(45) Date of Patent: *Apr. 22, 2014

(54) AUTOMATED DISCOVERY AND INVENTORY OF NODES WITHIN AN AUTONOMIC DISTRIBUTED COMPUTING SYSTEM

(75) Inventor: Jonathan Sparks, Woodbury, MN (US)

(73) Assignee: CA, Inc., Islandia, NY (US)

( * ) Notice: Subject to any disclaimer, the term of this patent is extended or adjusted under 35 U.S.C. 154(b) by 676 days.

This patent is subject to a terminal disclaimer.

(21) Appl. No.: 12/559,310

(22) Filed: Sep. 14, 2009

(65) Prior Publication Data

US 2010/0005160 A1    Jan. 7, 2010

Related U.S. Application Data

(63) Continuation of application No. 11/070,851, filed on Mar. 2, 2005, now Pat. No. 7,590,653.

(51) Int. Cl.
G06F 15/173 (2006.01)
H04L 12/24 (2006.01)

(52) U.S. Cl.
CPC ............ H04L 41/14 (2013.01); H04L 41/0806 (2013.01)
USPC .......................................... 709/226; 709/220

(58) Field of Classification Search
USPC ......................................... 709/220–223, 226
See application file for complete search history.

(56) References Cited

U.S. PATENT DOCUMENTS

| | | | |
|---|---|---|---|
| 5,715,396 A | 2/1998 | Chatwani et al. | |
| 5,751,967 A | 5/1998 | Raab et al. | |
| 5,774,377 A | 6/1998 | Eidson et al. | |
| 5,956,515 A | 9/1999 | Beals et al. | |
| 6,018,747 A | 1/2000 | Burns et al. | |
| 6,134,594 A | 10/2000 | Helland et al. | |
| 6,282,568 B1 | 8/2001 | Sondur et al. | |
| 6,430,622 B1 | 8/2002 | Aiken, Jr. et al. | |
| 6,484,261 B1 | 11/2002 | Wiegel | |
| 6,532,465 B2 | 3/2003 | Hartley et al. | |
| 6,535,915 B1 | 3/2003 | Valys et al. | |
| 6,535,977 B1 | 3/2003 | Holle et al. | |

(Continued)

FOREIGN PATENT DOCUMENTS

WO    WO/03/085526 A1    10/2003

OTHER PUBLICATIONS

International Search Report and Written Opinion from International Application No. PCT/US2006/007549, mailed Jul. 11, 2006, 11 pgs.

(Continued)

*Primary Examiner* — David Lazaro
(74) *Attorney, Agent, or Firm* — Baker Botts, LLP

(57) ABSTRACT

A distributed computing system conforms to a multi-level, hierarchical organizational model. One or more control nodes provide for the efficient and automated allocation and management of computing functions and resources within the distributed computing system in accordance with the organization model. The model includes four distinct levels: fabric, domains, tiers and nodes that provide for the logical abstraction and containment of the physical components as well as system and service application software of the enterprise. A user, such as a system administrator, interacts with the control nodes to logically define the hierarchical organization of distributed computing system. The control node detects the addition of a node added to the network and automatically identifies attributes for the detected node.

27 Claims, 22 Drawing Sheets

(56) References Cited

U.S. PATENT DOCUMENTS

| | | | |
|---|---|---|---|
| 6,775,423 B2 | 8/2004 | Kulkarni et al. | |
| 6,775,829 B1 | 8/2004 | Kroening | |
| 6,865,737 B1 | 3/2005 | Lucas et al. | |
| 6,912,221 B1 | 6/2005 | Zadikian et al. | |
| 6,920,493 B1 | 7/2005 | Schwab | |
| 6,944,662 B2 | 9/2005 | Devine et al. | |
| 7,055,040 B2 | 5/2006 | Klemba et al. | |
| 7,203,731 B1 | 4/2007 | Coates et al. | |
| 7,590,653 B2 * | 9/2009 | Sparks | 1/1 |
| 2002/0156877 A1 | 10/2002 | Lu et al. | |
| 2003/0005276 A1 * | 1/2003 | French et al. | 713/2 |
| 2003/0051020 A1 | 3/2003 | Kadam et al. | |
| 2003/0097438 A1 | 5/2003 | Bearden et al. | |
| 2003/0126265 A1 | 7/2003 | Aziz et al. | |
| 2003/0131078 A1 | 7/2003 | Scheer et al. | |
| 2003/0140282 A1 | 7/2003 | Kaler et al. | |
| 2003/0177176 A1 | 9/2003 | Hirschfeld et al. | |
| 2003/0195957 A1 | 10/2003 | Banginwar | |
| 2003/0229792 A1 | 12/2003 | Baldwin et al. | |
| 2004/0088694 A1 | 5/2004 | Ho | |
| 2004/0123141 A1 | 6/2004 | Yadav | |
| 2004/0162741 A1 | 8/2004 | Flaxer et al. | |
| 2004/0181794 A1 | 9/2004 | Coleman et al. | |
| 2004/0187104 A1 | 9/2004 | Sardesai et al. | |
| 2004/0201611 A1 | 10/2004 | Bagsby | |
| 2004/0253956 A1 | 12/2004 | Collins | |
| 2004/0260734 A1 | 12/2004 | Ren et al. | |
| 2005/0005200 A1 | 1/2005 | Matena et al. | |
| 2005/0027831 A1 | 2/2005 | Anderson et al. | |
| 2005/0027865 A1 | 2/2005 | Bozak et al. | |
| 2005/0091227 A1 | 4/2005 | McCollum et al. | |
| 2005/0091348 A1 | 4/2005 | Ferri et al. | |
| 2005/0193265 A1 | 9/2005 | Lin et al. | |
| 2005/0246301 A1 | 11/2005 | Lin et al. | |
| 2006/0015773 A1 | 1/2006 | Singh et al. | |
| 2006/0047789 A1 | 3/2006 | Kumar et al. | |
| 2006/0179106 A1 | 8/2006 | Turner et al. | |
| 2008/0177821 A1 | 7/2008 | Tsao | |
| 2008/0215734 A1 | 9/2008 | Walker et al. | |

OTHER PUBLICATIONS

International Preliminary Report on Patentability from corresponding PCT Application Serial No. PCT/US2006/007549 mailed Sep. 20, 2007 (7 pages).
Office Action dated Oct. 4, 2007 for U.S. Appl. No. 11/046,133, filed Jan. 28, 2005, (19 pages).
Office Action dated Mar. 19, 2007 for U.S. Appl. No. 11/176,161, filed Jul. 7, 2005, (29 pages).
Office Action mailed Oct. 2, 2007, for U.S. Appl. No. 11/191,882, (27 pages).
E.N. Herness et al., "WebSphere Application Server: A Foundation for on Demand Computing," IBM Systems Journal IBM, vol. 43, No. 2, pp. 213-237, 2004.
B. Urgaonkar et al., "Resource Overbooking and Application Profiling in Shared Hosting Platforms," Proceedings of the 5$^{th}$ Symposium on Operating Systems Design and Implementation, pp. 239-254, 2002.
G. Lodi et al., "QoS-aware Clustering of Application Servers," Proceedings of the 1$^{st}$ IEEE Workshop on Quality of Service for Application Servers, in Conjunction With the 23$^{rd}$ International Symposium on Reliable Distributed Systems, 3 pages, Oct. 17, 2004.
*Preinstalling Microsoft Windows XP by Using the OEM Preinstallation Kit, Part 1*, XP-002301441, Apr. 4, 2003, 24 pages.
R. Mark Koan et al., *It Takes a Village to Build an Image*, XP-002384269, 2003, pp. 200-207.
Office Action dated Jan. 2, 2008, for U.S. Appl. No. 11/176,161, (21 pages).
Office Action dated Jan. 2, 2008, for U.S. Appl. No. 11/191,384, (30 pages).
Office Action dated Apr. 7, 2008, for U.S. Appl. No. 11/046,152, (25 pages).
Office Action dated Apr. 18, 2008, for U.S. Appl. No. 11/047,468 (21 pages).
Office Action dated Apr. 18, 2008, for U.S. Appl. No. 11/074,291, (33 pages).
Office Action dated May 1, 2008, for U.S. Appl. No. 11/191,882, (33 pages).
Office Action dated May 2, 2008, for U.S. Appl. No. 11/046,133, (24 pages).
Office Action dated Jul. 21, 2008, for U.S. Appl. No. 11/191,384, (35 pages).
Office Action dated Sep. 19, 2008 for U.S. Appl. No. 11/074,291, (36 pages).
Office Action dated Oct. 30, 2008 for U.S. Appl. No. 11/047,468, (21 pages).
Office Action dated Oct. 6, 2008 for U.S. Appl. No. 11/191,882, (34 pages).
Office Action dated Oct. 17, 2008 for U.S. Appl. No. 11/046,152, (29 pages).
Notice of Allowance dated Aug. 17, 2009, for U.S. Appl. No. 11/047,468, (10 pages).
Office Action dated Apr. 3, 2009, for U.S. Appl. No. 11/046,152, (24 pages).
Notice of Allowance dated Jul. 16, 2008, for U.S. Appl. No. 11/176,161, (10 pages).
Notice of Allowance dated Oct. 10, 2008, for U.S. Appl. No. 11/191,384, (9 pages).
Notice of Allowance dated Mar. 17, 2009, for U.S. Appl. No. 11/191,882, (16 pages).
Notice of Allowance dated Nov. 26, 2008, for U.S. Appl. No. 11/046,133, (4 pages).
Notice of Allowance dated Apr. 13, 2009, for U.S. Appl. No. 11/070,851, (18 pages).
Office Action dated Jul. 21, 2008 for U.S. Appl. No. 11/191,384, (34 pages).

* cited by examiner

ID
AUTOMATED DISCOVERY AND INVENTORY OF NODES WITHIN AN AUTONOMIC DISTRIBUTED COMPUTING SYSTEM

This application is a continuation of U.S. application Ser. No. 11/070,851, filed Mar. 2, 2005, the entire content of which is incorporated herein by reference.

TECHNICAL FIELD

The invention relates to computing environments and, more specifically, to distributed computing systems.

BACKGROUND

Distributed computing systems are increasingly being utilized to support high-performance computing applications. Typically, distributed computing systems are constructed from a collection of computing nodes that combine to provide a set of processing services to implement the high performance computing applications. Each of the computing nodes in the distributed computing system is typically a separate, independent computing device interconnected with each of the other computing nodes via a communications medium, e.g., a network.

One challenge with distributed computing systems is the organization, deployment and administration of such a system within an enterprise environment. For example, it is often difficult to manage the allocation and deployment of enterprise computing functions within the distributed computing system. An enterprise, for example, often includes several business groups, and each group may have competing and variable computing requirements.

SUMMARY

In general, the invention is directed to a distributed computing system that conforms to a multi-level, hierarchical organizational model. One or more control nodes provide for the efficient and automated allocation and management of computing functions and resources within the distributed computing system in accordance with the organization model.

As described herein, the model includes four distinct levels: fabric, domains, tiers and nodes that provide for the logical abstraction and containment of the physical components as well as system and service application software of the enterprise. A user, such as a system administrator, interacts with the control nodes to logically define the hierarchical organization of the distributed computing system. The control nodes are responsible for all levels of management in accordance with the model, including fabric management, domain creation, tier creation and node allocation and deployment.

In one embodiment, a method comprises detecting a node added to a network and automatically identifying attributes for the detected node. The method further comprises updating a model to store the attributes for the detected node, wherein the model defines an organization of a distributed computing system having a plurality of computing nodes. The method further comprises automatically deploying the detected node within the distributed computing system in accordance with the model based on the attributes.

In another embodiment, a distributed computing system comprises a plurality of application nodes interconnected via a network, and a control node. The control node detects the addition of a node to the network and automatically identifies attributes for the detected node.

In another embodiment, a computer-readable medium comprises instructions that cause a processor to detect a node added to a network, automatically identify attributes for the detected node, and update a model to store the attributes for the detected node. The model defines an organization of a distributed computing system having a plurality of computing nodes. The instructions further cause the processor to automatically deploy the detected node within the distributed computing system in accordance with the model based on the attributes.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 9 is a screen illustration of an exemplary user interface for viewing and identify properties of a computing node.

FIG. 11 is a screen illustration of an exemplary user interface for viewing a hardware inventory report.

DETAILED DESCRIPTION

Figure 1:
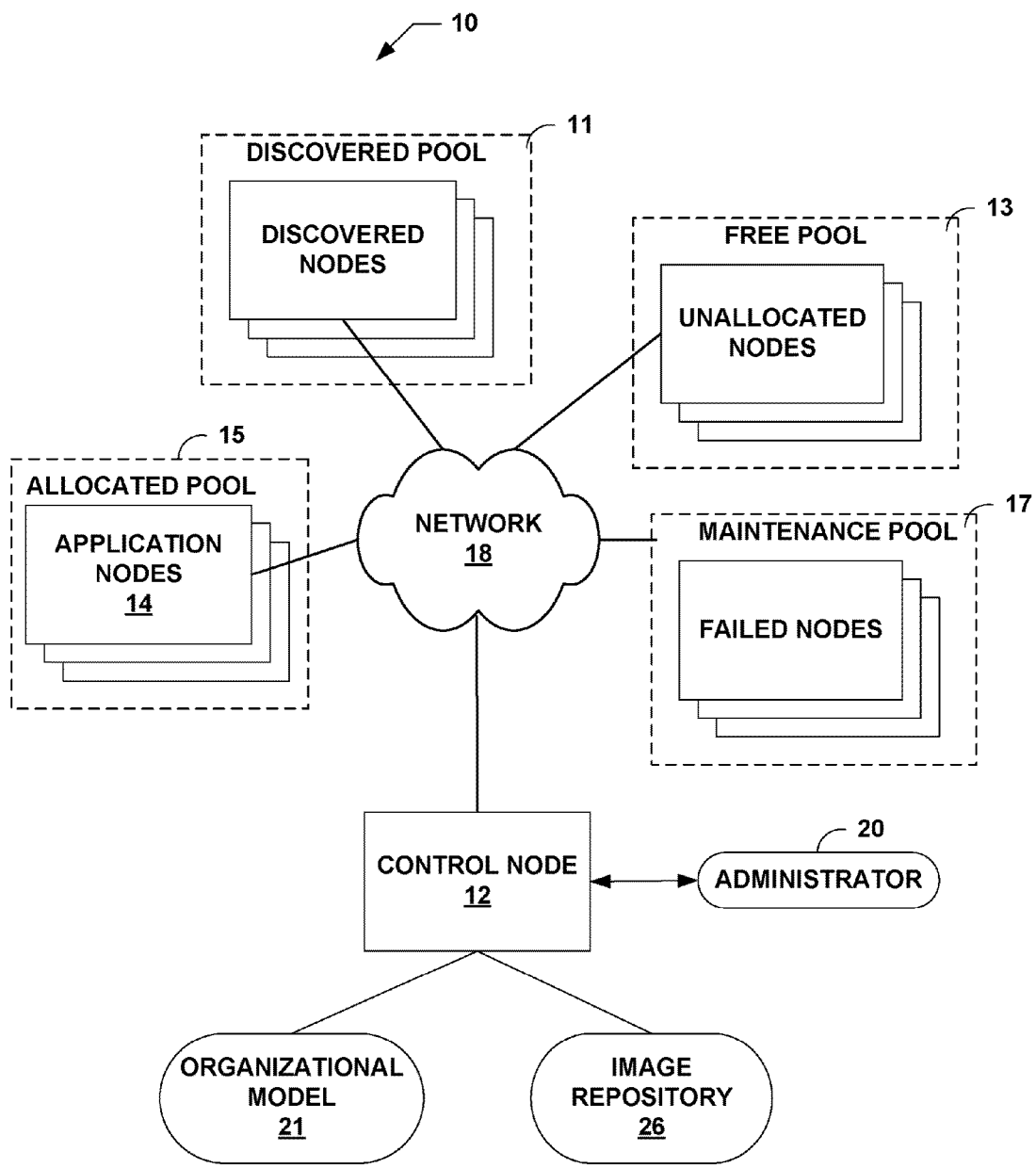
FIG. 1 is a block diagram illustrating a distributed computing system constructed from a collection of computing nodes.

FIG. 1 is a block diagram illustrating a distributed computing system 10 constructed from a collection of computing nodes. Distributed computing system 10 may be viewed as a collection of computing nodes operating in cooperation with each other to provide high-performance processing.

In the illustrated example, the collection of computing nodes forming distributed computing system 10 are logically grouped within a discovered pool 11, a free pool 13, an allocated pool 15 and a maintenance pool 17. In addition, distributed computing system 10 includes at least one control node 12.

Within distributed computing system 10, a computing node refers to the physical computing device. The number of computing nodes needed within distributed computing system 10 is dependent on the processing requirements. For example, distributed computing system 10 may include 8 to 512 computing nodes or more. Each computing node includes one or more programmable processors for executing software instructions stored on one or more computer-readable media.

Discovered pool 11 includes a set of discovered nodes that have been automatically "discovered" within distributed computing system 10 by control node 12. As described further below, control node 12 may monitor dynamic host communication protocol (DHCP) leases to discover the connection of a node to network 18. Once detected, control node 12 automatically inventories the attributes for the discovered node and reassigns the discovered node to free pool 13. The node attributes identified during the inventory process may include a CPU count, a CPU speed, an amount of memory (e.g., RAM), local disk characteristics or other computing resources. Control node 12 may also receive input identifying node attributes not detectable via the automatic inventory, such as whether the node includes I/O, such as HBA.

Free pool 13 includes a set of unallocated nodes that are available for use within distributed computing system 10. Control node 12 may dynamically reallocate an unallocated node from free pool 13 to allocated pool 15 as an application node 14. For example, control node 12 may use unallocated nodes from free pool 13 to replace a failed application node 14 or to add an application node to allocated pool 15 to increase processing capacity of distributed computing system 10.

In general, allocated pool 15 includes application nodes 14 that are currently providing a computing environment for execution of user software applications. In addition, although not illustrated separately, application nodes 14 may include one or more input/output (I/O) nodes. Application nodes 14 typically have more substantial I/O capabilities than control node 12, and are typically configured with more computing resources (e.g., processors and memory). Maintenance pool 17 includes a set of nodes that either could not be inventoried or that failed and have been taken out of service from allocated pool 15.

Control node 12 provides the system support functions for managing distributed computing system 10. More specifically, control node 12 manages the roles of each computing node within distributed computing system 10 and the execution of software applications within the distributed computing system. In general, distributed computing system 10 includes at least one control node 12, but may utilize additional control nodes to assist with the management functions.

Other control nodes 12 (not shown in FIG. 1) are optional and may be associated with a different subset of the computing nodes within distributed computing system 10. Moreover, control node 12 may be replicated to provide primary and backup administration functions, thereby allowing for graceful handling a failover in the event control node 12 fails.

Network 18 provides a communications interconnect for control node 12 and application nodes 14, as well as discovered nodes, unallocated nodes and failed nodes. Communications network 18 permits internode communications among the computing nodes as the nodes perform interrelated operations and functions. Communications network 18 may comprise, for example, direct connections between one or more of the computing nodes, one or more customer networks maintained by an enterprise, local area networks (LANs), wide area networks (WANs) or a combination thereof. Communications network 18 may include a number of switches, routers, firewalls, load balancers, and the like.

In one embodiment, each of the computing nodes within distributed computing system 10 executes a common general-purpose operating system. One example of a general-purpose operating system is the Windows™ operating system provided by Microsoft Corporation. In some embodiments, the general-purpose operating system such as the Linux kernel.

In the example of FIG. 1, control node 12 is responsible for software image management. The term "software image" refers to a complete set of software loaded on an individual computing node, including the operating system and all boot code, middleware and application files. System administrator 20 may interact with control node 12 and identify the particular types of software images to be associated with application nodes 14. Alternatively, administration software executing on control node 12 may automatically identify the appropriate software images to be deployed to application nodes 14 based on the input received from system administrator 20. For example, control node 12 may determine the type of software image to load onto an application node 14 based on the functions assigned to the node by system administrator 20. Application nodes 14 may be divided into a number of groups based on their assigned functionality. As one example, application nodes 14 may be divided into a first group to provide web server functions, a second group to provide business application functions and a third group to provide database functions. The application nodes 14 of each group may be associated with different software images.

Control node 12 provides for the efficient allocation and management of the various software images within distributed computing system 10. In some embodiments, control node 12 generates a "golden image" for each type of software image that may be deployed on one or more of application nodes 14. As described herein, the term "golden image" refers to a reference copy of a complete software stack.

System administrator 20 may create a golden image by installing an operating system, middleware and software applications on a computing node and then making a complete copy of the installed software. In this manner, a golden image may be viewed as a "master copy" of the software image for a particular computing function. Control node 12 maintains a software image repository 26 that stores the golden images associated with distributed computing system 10.

Control node 12 may create a copy of a golden image, referred to as an "image instance," for each possible image instance that may be deployed within distributed computing system 10 for a similar computing function. In other words, control node 12 pre-generates a set of K image instances for a golden image, where K represents the maximum number of image instances for which distributed computing system 10 is configured for the particular type of computing function. For a given computing function, control node 12 may create the complete set of image instance even if not all of the image instances will be initially deployed. Control node 12 creates different sets of image instances for different computing functions, and each set may have a different number of image instances depending on the maximum number of image instances that may be deployed for each set. Control node 12 stores the image instances within software image repository 26. Each image instance represents a collection of bits that may be deployed on an application node.

Further details of software image management are described in co-pending U.S. patent application Ser. No. 11/046,133, entitled "MANAGEMENT OF SOFTWARE IMAGES FOR COMPUTING NODES OF A DISTRIBUTED COMPUTING SYSTEM," filed Jan. 28, 2005 and co-pending U.S. patent application Ser. No. 11/046,152, entitled "UPDATING SOFTWARE IMAGES ASSOCIATED WITH A DISTRIBUTED COMPUTING SYSTEM," filed Jan. 28, 2005, each of which is incorporated herein by reference.

In general, distributed computing system 10 conforms to a multi-level, hierarchical organizational model that includes four distinct levels: fabric, domains, tiers and nodes. Control node 12 is responsible for all levels of management, including fabric management, domain creation, tier creation and node allocation and deployment.

As used herein, the "fabric" level generally refers to the logical constructs that allow for definition, deployment, partitioning and management of distinct enterprise applications. In other words, fabric refers to the integrated set of hardware, system software and application software that can be "knitted" together to form a complete enterprise system. In general, the fabric level consists of two elements: fabric components or fabric payload. Control node 12 provides fabric management and fabric services as described herein.

In contrast, a "domain" is a logical abstraction for containment and management within the fabric. The domain provides a logical unit of fabric allocation that enables the fabric to be partitioned amongst multiple uses, e.g. different business services.

Domains are comprised of tiers, such as a 4-tier application model (web server, application server, business logic, persistence layer) or a single tier monolithic application. Fabric domains contain the free pool of devices available for assignment to tiers.

A tier is a logically associated group of fabric components within a domain that share a set of attributes: usage, availability model or business service mission. Tiers are used to define structure within a domain e.g. N-tier application, and each tier represents a different computing function. A user, such as administrator 20, typically defines the tier structure within a domain. The hierarchical architecture may provide a high degree of flexibility in mapping customer applications to logical models which run within the fabric environment. The tier is one construct in this modeling process and is the logical container of application resources.

The lowest level, the node level, includes the physical components of the fabric. This includes computing nodes that, as described above, provide operating environments for system applications and enterprise software applications. In addition, the node level may include network devices (e.g., Ethernet switches, load balancers and firewalls) used in creating the infrastructure of network 18. The node level may further include network storage nodes that are network connected to the fabric.

System administrator 20 accesses administration software executing on control node 12 to logically define the hierarchical organization of distributed computing system 10. For example, system administrator 20 may provide input to develop an organizational model 21 for the enterprise and logically define the enterprise fabric. System administrator 20 may, for instance, develop a model for the enterprise that includes a number of domains, tiers, and node slots hierarchically arranged within a single enterprise fabric.

More specifically, system administrator 20 defines one or more domains that each correspond to a single enterprise application or service, such as a customer relation management (CRM) service. System administrator 20 further defines one or more tiers within each domain that represent the functional subcomponents of applications and services provided by the domain. As an example, system administrator 20 may define a storefront domain within the enterprise fabric that includes a web tier, an application tier and a database tier. In this manner, distributed computing system 10 may be configured to automatically provide web server functions, business application functions and database functions.

For each of the tiers, control node 12 creates a number of "node slots" equal to the maximum number of application nodes 14 that may be deployed. In general, each node slot represents a data set that describes specific information for a corresponding node, such as software resources for a physical node that is assigned to the node slot. The node slots may, for instance, identify a particular software image instance associated with an application node 14 as well as a network address associated with that particular image instance.

In this manner, each of the tiers include one or more node slots that reference particular software image instances to boot on the application nodes 14 to which each software image instance is assigned. The application nodes 14 to which control node 12A assigns the image instances temporarily inherit the network address assigned to the image instance for as long as the image instance is deployed on that particular application node. If for some reason the image instance is moved to a different application node 14, control node 12A moves the network address to that new application node.

System administrator 20 may further define specific node requirements for each tier of the fabric. For example, the node requirements specified by system administrator 20 may include a central processing unit (CPU) count, a CPU speed, an amount of memory (e.g., RAM), local disk characteristics and other hardware characteristics that may be detected on the individual computing nodes. System administrator 20 may also specify user-defined hardware attributes of the computing nodes, such as whether I/O (like HBA) is required. The user-defined hardware attributes are typically not capable of detection during an automatic inventory. In this manner, system administrator 20 creates a list of attributes that the tier requires of its candidate computing nodes.

In addition to the node requirements described above, system administrator 20 may further define policies that are used when re-provisioning computing nodes within the fabric. System administrator 20 may define policies regarding tier characteristics, such as a minimum number of nodes a tier requires, an indication of whether or not a failed node is dynamically replaced by a node from free pool 13, a priority for each tier relative to other tiers, an indication of whether or not a tier allows nodes to be re-provisioned to other tiers to satisfy processing requirements by other tiers of a higher priority or other policies. Control node 12 uses the policy information input by system administrator 20 to re-provision computing nodes to meet tier processing capacity demands.

After receiving input from system administrator 20 defining the architecture and policy of the enterprise fabric, control node 12 identifies unallocated nodes within free pool 13 that satisfy required node attributes. Control node 12 automatically assigns unallocated nodes from free pool 13 to respective tier node slots of a tier. As will be described in detail herein, in one embodiment, control node 12 may assign computing nodes to the tiers in a "best fit" fashion. Particularly, control node 12 assigns computing nodes to the tier whose node attributes most closely match the node requirements of the tier as defined by administrator 20. The assignment of the computing nodes may occur on a tier-by-tier basis beginning with a tier with the highest priority and ending with a tier with the lowest priority.

As will be described in detail below, control node 12 may automatically add unallocated nodes from free pool 13 to a tier when more processing capacity is needed within the tier, remove nodes from a tier to the free pool when the tier has excess capacity, transfer nodes from tier to tier to meet processing demands, or replace failed nodes with nodes from the free pool. Thus, computing resources, i.e., computing nodes, may be automatically shared between tiers and domains within the fabric based on user-defined policies to dynamically address high-processing demands, failures and other events.

Figure 2:
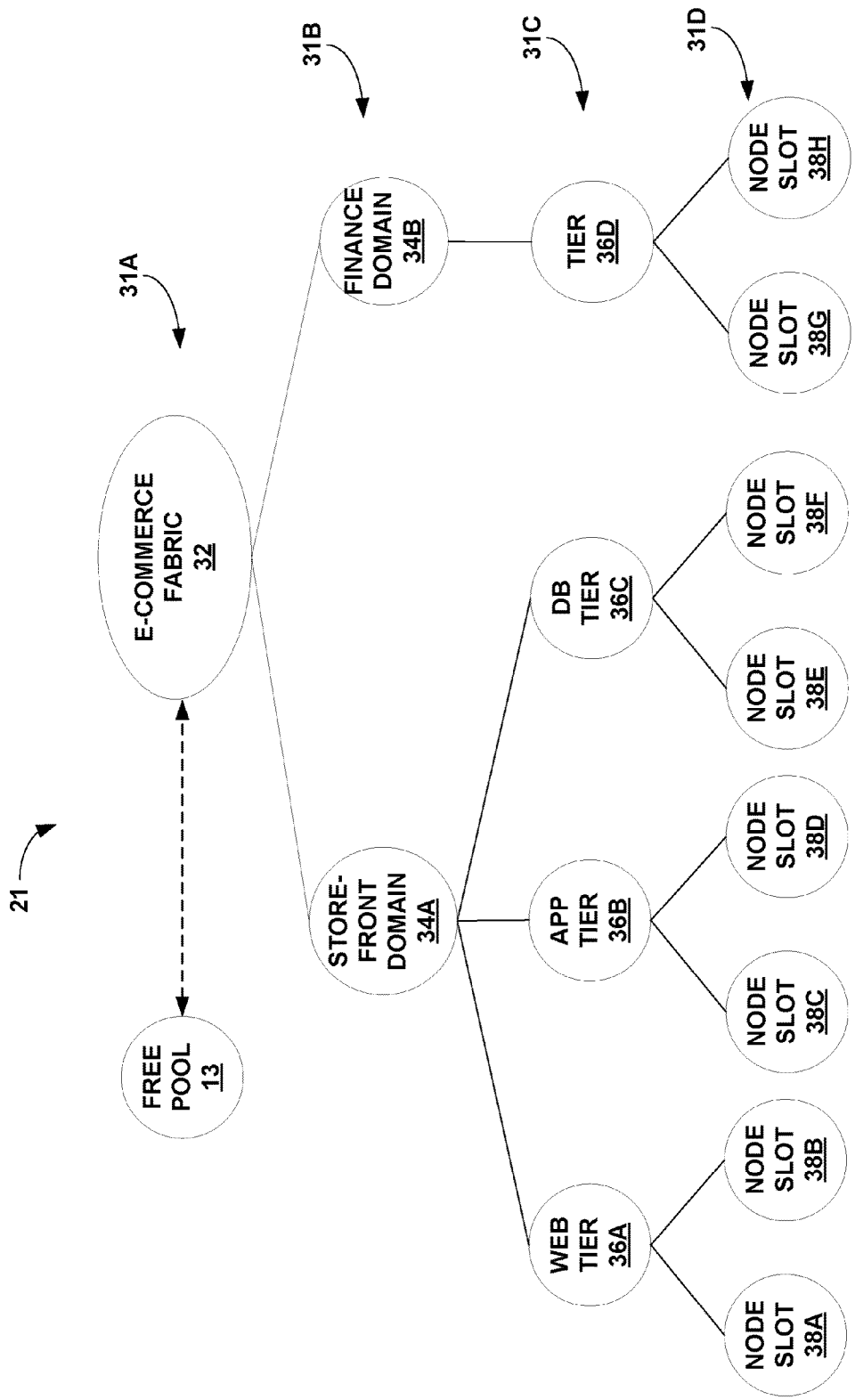
FIG. 2 is a schematic diagram illustrating an example of a model of an enterprise that logically defines an enterprise fabric.

FIG. 2 is a schematic diagram illustrating an example embodiment of an organizational model 21 that logically representing an enterprise fabric in accordance with the invention. In the example illustrated in FIG. 2, control node 12 (FIG. 1) maintains organizational model 21 to define a simple e-commerce fabric 32.

In this example, e-commerce fabric 32 includes a storefront domain 34A and a financial planning domain 34B. Storefront domain 34A corresponds to the enterprise storefront domain and allows customers to find and purchase products over a network, such as the Internet. Financial planning domain 34B allows one or more employees to perform financial planning tasks for the enterprise.

Tier level 31C includes one or more tiers within each domain that represent the functional subcomponents of applications and services provided by the domain. For example, storefront domain 34A includes a web server tier (labeled "web tier") 36A, a business application tier (labeled "app tier") 36B, and a database tier (labeled "DB tier") 36C. Web server tier 36A, business application tier 36B and database tier 36C interact with one another to present a customer with an online storefront application and services. For example, the customer may interact with web server tier 36A via a web browser. When the customer searches for a product, web server tier 36A may interacts with business application tier 36B, which may in turn access a database tier 36C. Similarly, financial planning domain 34B includes a financial planning tier 36D that provides subcomponents of applications and services of the financial planning domain 34B. Thus, in this example, a domain may include a single tier.

Tier level 31D includes one or more logical node slots 38A-38H ("node slots 38") within each of the tiers. Each of node slots 38 include node specific information, such as software resources for an application node 14 that is assigned to a respective one of the node slots 38. Node slots 38 may, for instance, identify particular software image instances within image repository 26 and map the identified software image instances to respective application nodes 14. As an example, node slots 38A and 38B belonging to web server tier 36A may reference particular software image instances used to boot two application nodes 14 to provide web server functions. Similarly, the other node slots 38 may reference software image instances to provide business application functions, database functions, or financial application functions depending upon the tier to which the node slots are logically associated.

Although in the example of FIG. 2, there are two node slots 38 corresponding to each tier, the tiers may include any number of node slots depending on the processing capacity needed on the tier. Furthermore, not all of node slots 38 may be currently assigned to an application node 14. For example, node slot 28B may be associated with an inactive software image instance and, when needed, may be assigned to an application node 14 for deployment of the software image instance.

In this example, organizational data 21 associates free node pool 13 with the highest-level of the model, i.e., e-commerce fabric 32. As described above, control node 12 may automatically assign unallocated nodes from free node pool 13 to at least a portion of tier node slots 38 of tiers 36 as needed using the "best fit" algorithm described above or another algorithm. Additionally, control node 12 may also add nodes from free pool 13 to a tier when more processing capacity is needed within the tier, remove nodes from a tier to free pool 13 when a tier has excess capacity, transfer nodes from tier to tier to meet processing demands, and replace failed nodes with nodes from the free tier.

Although not illustrated, the model for the enterprise fabric may include multiple free node pools. For example, the model may associate free node pools with individual domains at the domain level or with individual tier levels. In this manner, administrator 20 may define policies for the model such that unallocated computing nodes of free node pools associated with domains or tiers may only be used within the domain or tier to which they are assigned. In this manner, a portion of the computing nodes may be shared between domains of the entire fabric while other computing nodes may be restricted to particular domains or tiers.

Figure 3:
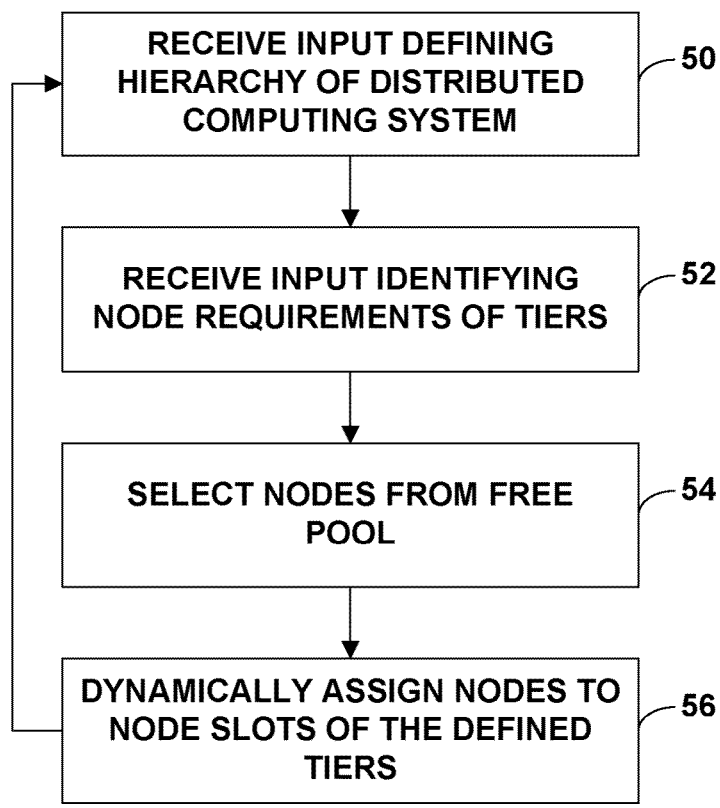
FIG. 3 is a flow diagram that provides a high-level overview of the operation of a control node when configuring the distributed computing system.

FIG. 3 is a flow diagram that provides a high-level overview of the operation of control node 12 when configuring distributed computing system 10. Initially, control node 12 receives input from a system administrator defining the hierarchical organization of distributed computing system 10 (50). In one example, control node 12 receives input that defines a model that specifies a number of hierarchically arranged nodes as described in detail in FIG. 2. Particularly, the defined architecture of distributed computing system 10 includes an overall fabric having a number of hierarchically arranged domains, tiers and node slots.

During this process, control node 12 may receive input specifying node requirements of each of the tiers of the hierarchical model (52). As described above, administrator 20 may specify a list of attributes, e.g., a central processing unit (CPU) count, a CPU speed, an amount of memory (e.g., RAM), or local disk characteristics, that the tiers require of their candidate computing nodes. In addition, control node 12 may further receive user-defined custom attributes, such as requiring the node to have I/O, such as HBA connectivity. The node requirements or attributes defined by system administrator 20 may each include a name used to identify the characteristic, a data type (e.g., integer, long, float or string), and a weight to define the importance of the requirement.

Control node 12 identifies the attributes for all candidate computing nodes within free pool 13 (54). As described above, control node 12 may have already discovered the computing nodes and inventoried the candidate computing nodes to identify hardware characteristics of all candidate computing nodes. Additionally, control node 12 may receive input from system administrator 20 identifying specialized capabilities of one or more computing nodes that are not detectable by the inventory process.

Control node 12 dynamically assigns computing nodes to the node slots of each tier based on the node requirements specified for the tiers and the identified node attributes (56). Population of the node slots of the tier may be performed on a tier-by-tier basis beginning with the tier with the highest priority, i.e., the tier with the highest weight assigned to it. As will be described in detail, in one embodiment, control node 12 may populate the node slots of the tiers with the computing nodes that have attributes that most closely match the node requirements of the particular tiers. Thus, the computing nodes may be assigned using a "best fit" algorithm.

Figure 4:
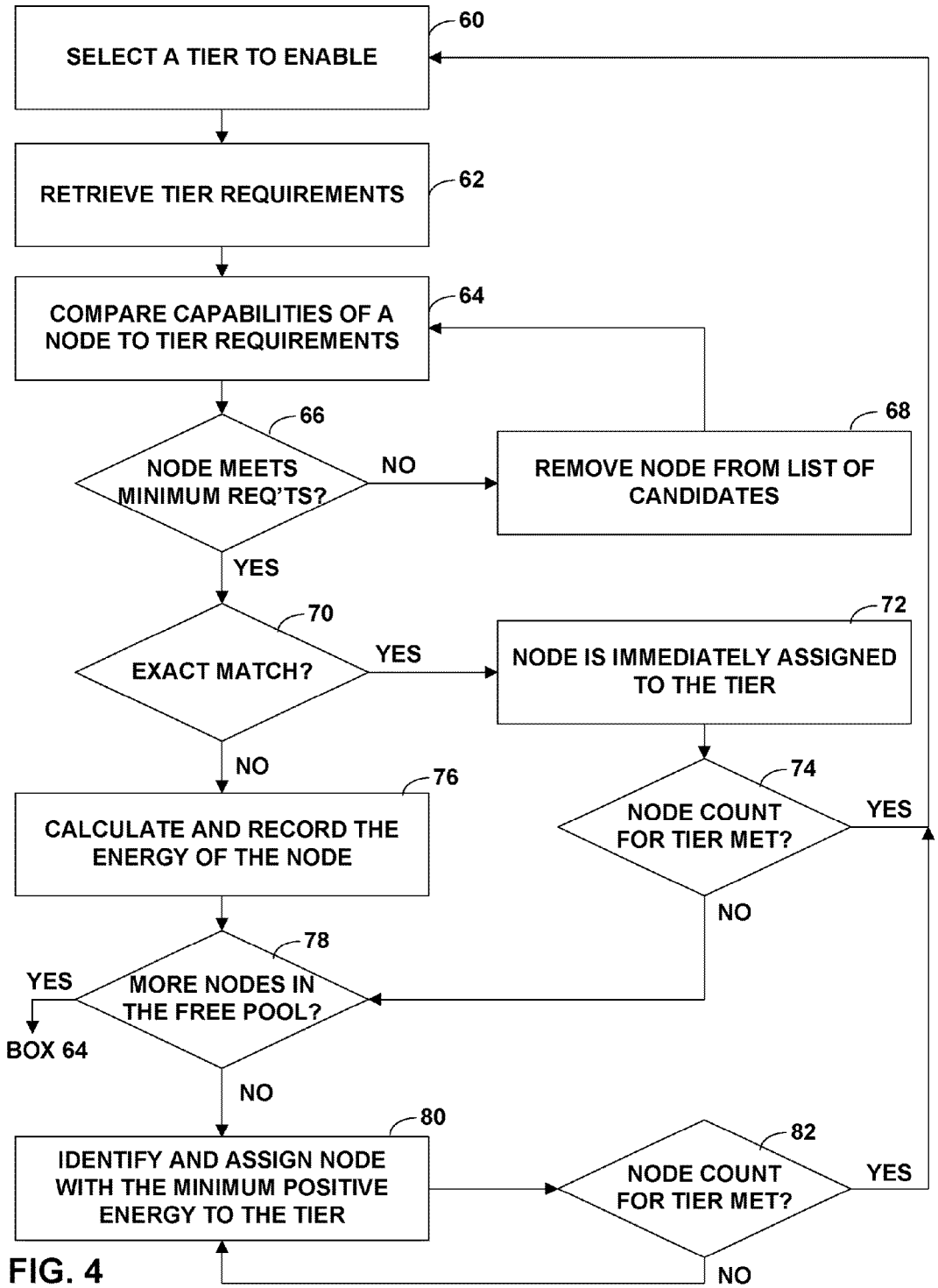
FIG. 4 is a flow diagram illustrating exemplary operation of the control node when assigning computing nodes to node slots of tiers.

FIG. 4 is a flow diagram illustrating exemplary operation of control node 12 when assigning computing nodes to node slots of tiers. Initially, control node 12 selects a tier to enable (60). As described above, control node 12 may select the tier based on a weight or priority assigned to the tier by administrator 20. Control node 12 may, for example, initially select the tier with the highest priority and successively enable the tiers based on priority.

Next, control node 12 retrieves the node requirements associated with the selected tier (62). Control node 12 may, for example, maintain a database having entries for each node slot, where the entries identify the node requirements for each of the tiers. Control node 12 retrieves the node requirements for the selected tier from the database.

In addition, control node 12 accesses the database and retrieves the computing node attributes of one of the unallocated computing nodes of free pool 13. Control node 12 compares the node requirements of the tier to the node attributes of the selected computing node (64).

Based on the comparison, control node 12 determines whether the node attributes of the computing node meets the minimum node requirements of the tier (66). If the node attributes of the selected computing node do not meet the minimum node requirements of the tier, then the computing node is removed from the list of candidate nodes for this particular tier (68). Control node 12 repeats the process by retrieving the node attributes of another of the computing nodes of the free pool and compares the node requirements of the tier to the node attributes of the computing node.

If the node attributes of the selected computing node meet the minimum node requirements of the tier (YES of 66), control node 12 determines whether the node attributes are an exact match to the node requirements of the tier (70). If the node attributes of the selected computing node and the node requirements of the tier are a perfect match (YES of 70), the computing node is immediately assigned from the free pool to a node slot of the tier and the image instance for the slot is associated with the computing node for deployment (72).

Control node 12 then determines whether the node count for the tier is met (74). Control node 12 may, for example, determine whether the tier is assigned the minimum number of nodes necessary to provide adequate processing capabilities. In another example, control node 12 may determine whether the tier is assigned the ideal number of nodes defined by system administrator 20. When the node count for the tier is met, control node 12 selects the next tier to enable, e.g., the tier with the next largest priority, and repeats the process until all defined tiers are enabled, i.e., populated with application nodes (60).

If the node attributes of the selected computing node and the node requirements of the tier are not a perfect match control node 12 calculates and records a "processing energy" of the node (76). As used herein, the term "processing energy" refers to a numerical representation of the difference between the node attributes of a selected node and the node requirements of the tier. A positive processing energy indicates the node attributes more than satisfy the node requirements of the tier. The magnitude of the processing energy represents the degree to which the node requirements exceed the tier requirements.

After computing and recording the processing energy of the nodes, control node 12 determines whether there are more candidate nodes in free pool 13 (78). If there are additional candidate nodes, control node 12 repeats the process by retrieving the computing node attributes of another one of the computing nodes of the free pool of computing nodes and comparing the node requirements of the tier to the node attributes of the computing node (64).

When all of the candidate computing nodes in the free pool have been examined, control node 12 selects the candidate computing node having the minimum positive processing energy and assigns the selected computing node to a node slot of the tier (80). Control node 12 determines whether the minimum node count for the tier is met (82). If the minimum node count for the tier has not been met, control node 12 assigns the computing node with the next lowest calculated processing energy to the tier (80). Control node 12 repeats this process until the node count is met. At this point, control node 12 selects the next tier to enable, e.g., the tier with the next largest priority (60).

In the event there are an insufficient number of computing nodes in free pool 13, or an insufficient number of computing nodes that meet the tier requirements, control node 12 notifies system administrator 20. System administrator 20 may add more nodes to free pool 13, add more capable nodes to the free pool, reduce the node requirements of the tier so more of the unallocated nodes meet the requirements, or reduce the configured minimum node counts for the tiers.

Figure 5:
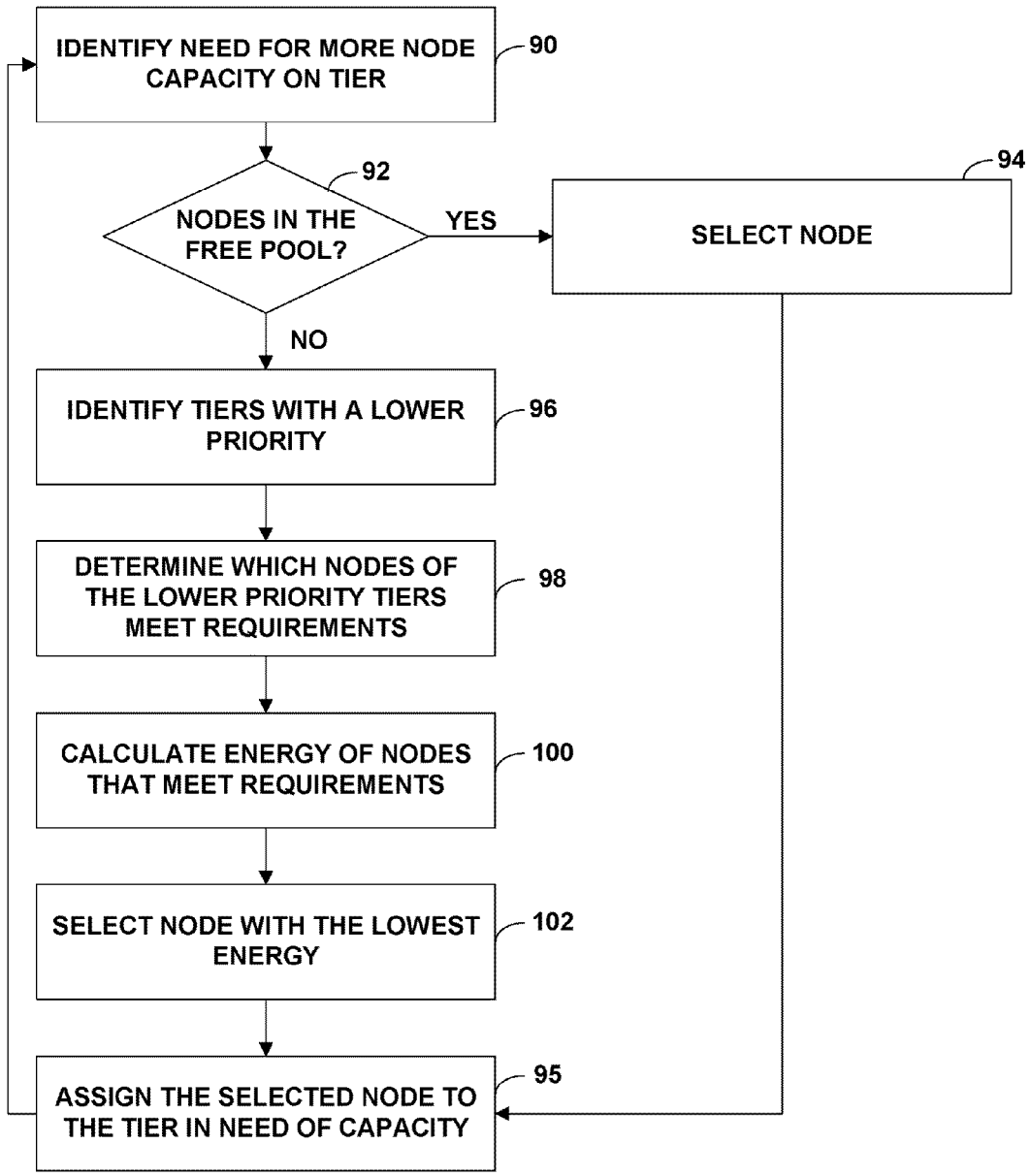
FIG. 5 is a flow diagram illustrating exemplary operation of a control node when adding an additional computing node to a tier to meet additional processing demands.

FIG. 5 is a flow diagram illustrating exemplary operation of control node 12 when adding an additional computing node to a tier to meet increased processing demands. Initially, control node 12 or system administrator 20 identifies a need for additional processing capacity on one of the tiers (90). Control node 12 may, for example, identify a high processing load on the tier or receive input from a system administrator identifying the need for additional processing capacity on the tier.

Control node 12 then determines whether there are any computing nodes in the free pool of nodes that meet the minimum node requirements of the tier (92). When there are one or more nodes that meet the minimum node requirements of the tier, control node 12 selects the node from the free pool based the node requirements of the tier, as described above, (94) and assigns the node to the tier (95). As described in detail with respect to FIG. 4, control node 12 may determine whether there are any nodes that have node attributes that are an exact match to the node requirements of the tier. If an exact match is found, the corresponding computing node is assigned to a node slot of the tier. If no exact match is found, control node 12 computes the processing energy for each node and assigns the computing node with the minimum processing energy to the tier. Control node 12 remotely powers on the assigned node and remotely boots the node with the image instance associated with the node slot. Additionally, the booted computing node inherits the network address associated with the node slot.

If there are no adequate computing nodes in the free pool, i.e., no nodes at all or no nodes that match the minimal node requirements of the tier, control node 12 identifies the tiers with a lower priority than the tier needing more processing capacity (96).

Control node 12 determines which of the nodes of the lower priority tiers meet the minimum requirements of the tier in need of processing capacity (98). Control node 12 may, for example, compare the attributes of each of the nodes assigned to node slots of the lower priority tiers to the node requirements of the tier in need of processing capacity. Lower priority tiers that have the minimum number of computing nodes may be removed from possible tiers from which to harvest an application node. If, however, all the lower priority tiers have the minimum number of computing nodes defined for the respective tier, the lowest priority tier is selected from which to harvest the one or more nodes.

Control node 12 calculates the processing energy of each of the nodes of the lower priority tiers that meet the minimum requirements (100). The energies of the nodes are calculated using the differences between the node attributes and the node requirements of the tier needing additional capacity. Control node 12 selects the computing node with the lowest processing energy that meets the minimum requirements, and assigns the selected computing node to the tier in need of processing capacity (102, 95).

Figure 6:
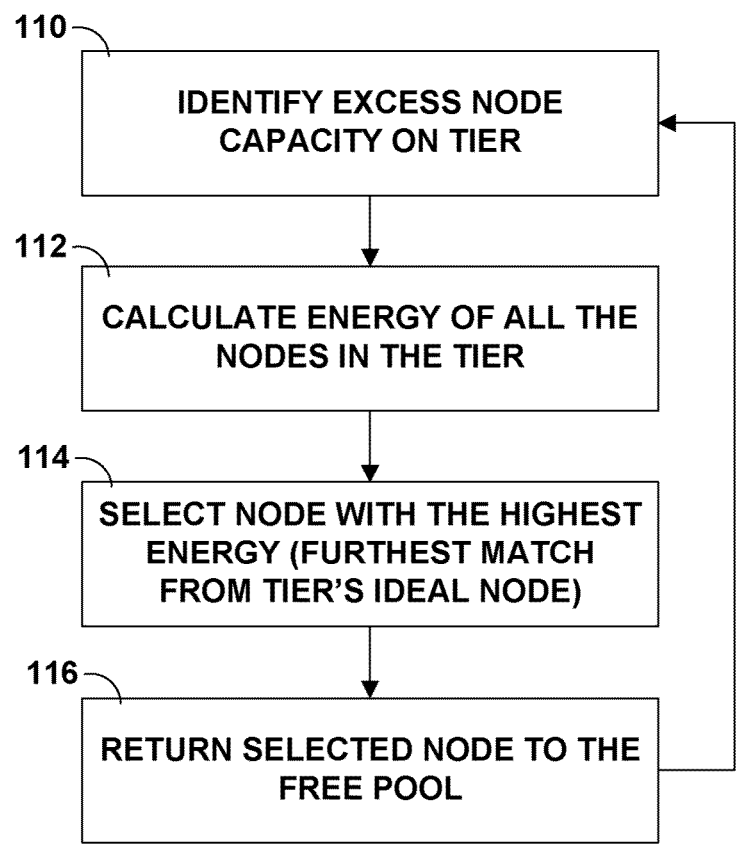
FIG. 6 is a flow diagram illustrating exemplary operation of a control node harvesting excess node capacity from one of the tiers and returning the harvested computing node to the free pool.

FIG. 6 is a flow diagram illustrating exemplary operation of control node 12 when harvesting excess node capacity from one of the tiers and returning the harvested computing node to free pool 13. Initially, control node 12 identifies a tier having excess node capacity (110). Control node 12 may, for example, periodically check the node capacity of the tiers to identify any tiers having excess node capacity. Performing a periodic check and removal of excess nodes increases the likelihood that a capable computing node will be in free pool 13 in the event one of the tiers needs additional node capacity.

When harvesting a node, control node 12 calculates the processing energy of all the nodes in the tier as described above with reference to FIG. 4 (112). Control node 12 identifies the node within the tier with the highest processing energy and returns the identified node to the free pool of nodes (114, 116). As described above, the node with the highest processing energy corresponds to the node whose node attributes are the most in excess of the node requirements of the tier.

Returning the node to the free pool may involve remotely powering off the computing node and updating the database to associate the harvested node with free pool 13. In addition, control node 12 updates the database to disassociate the returned node with the node slot to which it was assigned. At this point, the node no longer uses the network address associated with the image instance mapped to the node slot. Control node 12 may, therefore, assign a temporary network address to the node while the node is assigned to free pool 13.

Figure 7:
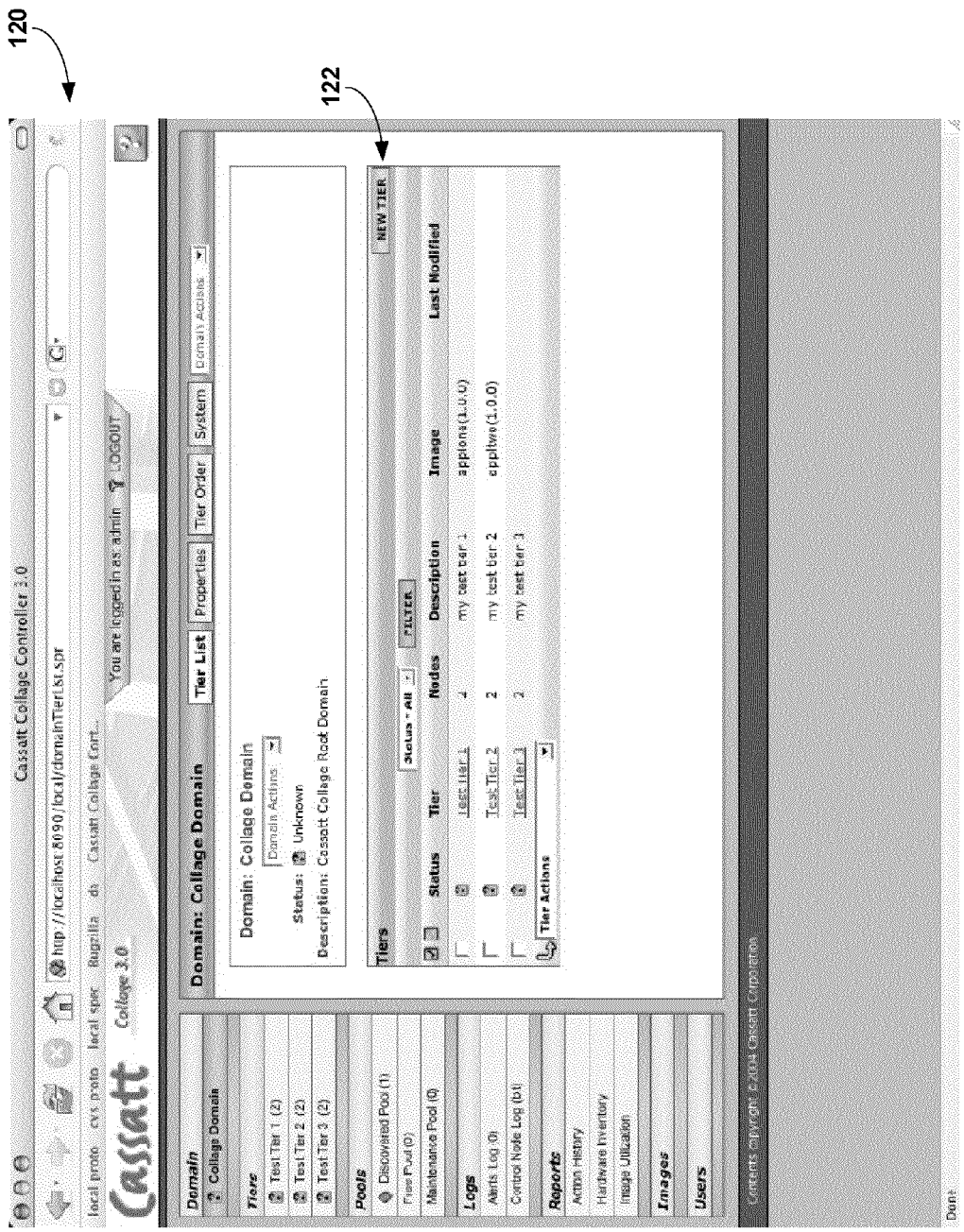
FIG. 7 is a screen illustration of an exemplary user interface for defining tiers in a particular domain.

FIG. 7 is a screen illustration of an exemplary user interface 120 presented by control node 12 with which administrator 20 interacts to define tiers for a particular domain. In the example illustrated in FIG. 7, system administrator 20 has selected the "Collage Domain." User interface 120 presents the tiers that are currently in the selected domain. In the example illustrated, the Collage Domain includes three tiers, "test tier 1," "test tier 2," and "test tier 3." As shown in FIG. 7, in this example, each of the tiers includes two nodes. In addition, user interface 120 lists the type of software image currently deployed to application nodes for each of the tiers. In the example illustrated, image "applone (1.0.0)" is deployed to the nodes of test tier 1 and image "appltwo (1.0.0)" is deployed to the nodes of test tier 2. System administrator 20 may add one or more tiers to the domain by clicking on new tier button 122.

Figure 8:
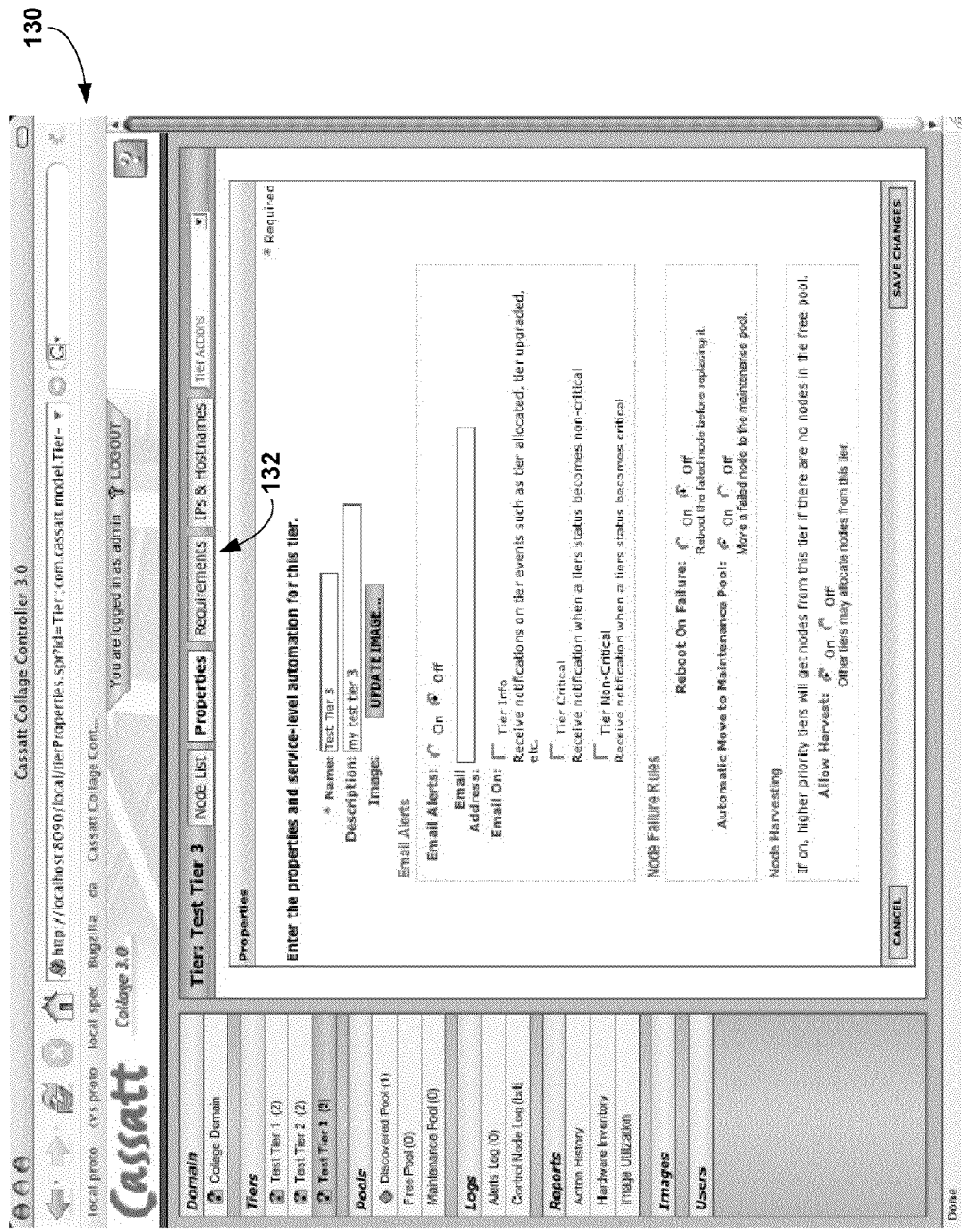
FIG. 8 is a screen illustration of an exemplary user interface for defining properties of the tiers.

FIG. 8 is a screen illustration of an exemplary user interface 130 for defining properties of the tiers. In particular, user interface 130 allows system administrator 20 to input a name for the tier, a description of the tier, and an image associated with the tier. The image associated with the tier refers to a master image from which image instances are generated and deployed to the nodes assigned to the tier.

When configuring a tier, system administrator 20 may elect to activate email alerts. For example, system administrator 20 may activate the email alerts feature in order to receive email alerts providing system administrator 20 with critical and/or non-critical tier information, such as a notification that a tier has been upgraded, a node of the tier has failed or the like. Furthermore, system administrator 20 may input various policies, such node failure rules. For example, system administrator 20 may identify whether control node 12 should reboot a node in case of failure or whether the failed node should automatically be moved to maintenance pool 17. Similarly, system administrator 20 may identify whether nodes assigned to the tier may be harvested by other tiers.

User interface 130 may also allow system administrator 20 to input node requirements of a tier. In order to input node requirements of a tier, system administrator 20 may click on the "Requirements" tab 132, causing user interface 130 to present an input area to particular node requirements of the tier.

Figure 9:
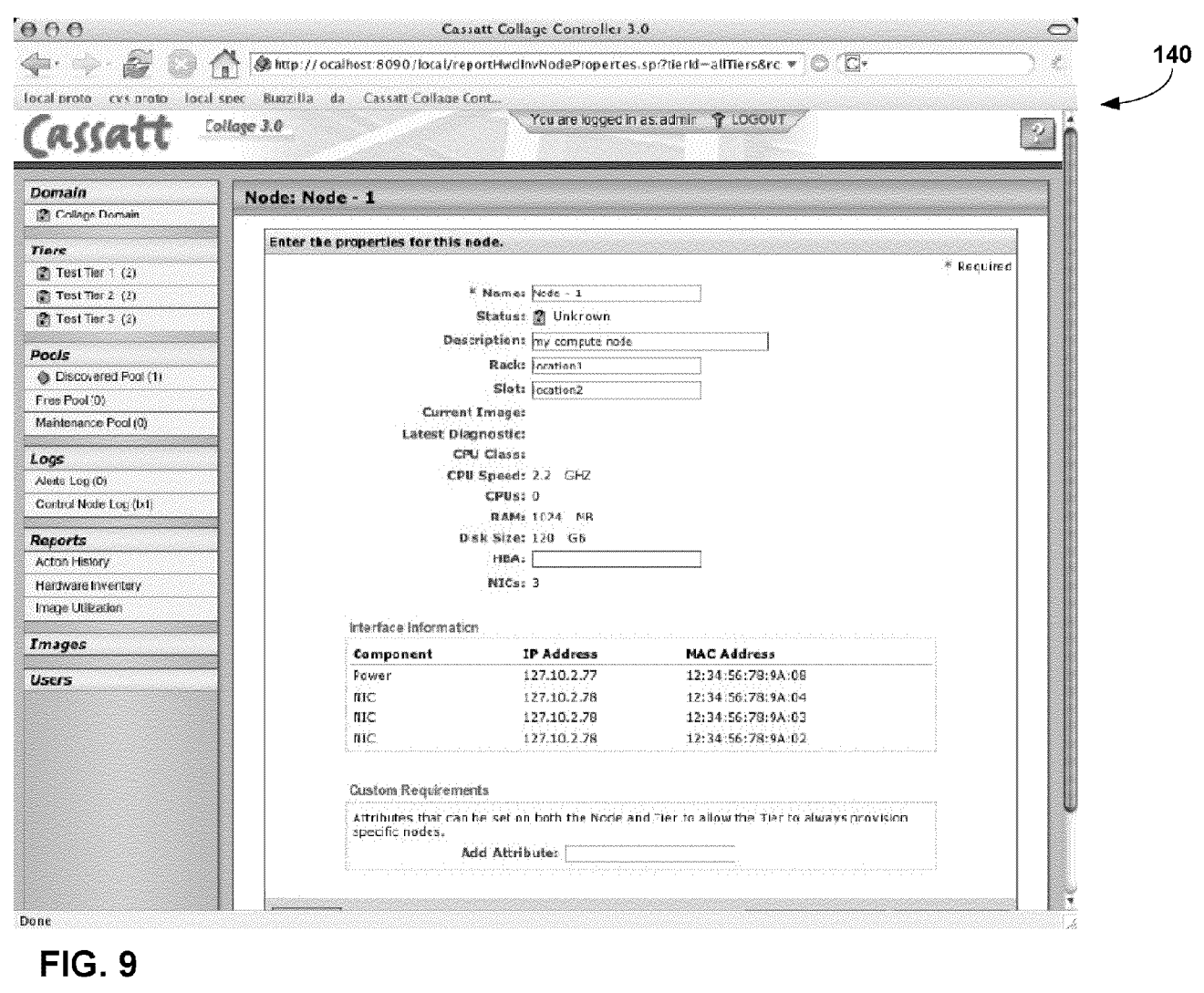

FIG. 9 is a screen illustration of an exemplary user interface 140 for viewing and identifying properties of a computing node. User interface 140 allows system administrator 20 to define a name, description, and location (including a rack and slot) of a computing node. In addition user interface 140 may specify user-defined properties of a node, such as whether the computing node has I/O HBA capabilities.

User interface 140 also displays properties that control node 12 has identified during the computing node inventory process. In this example, user interface 140 presents system administrator 20 with the a CPU node count, a CPU speed, the amount of RAM, the disk size and other characteristics that are identifiable during the automated node inventory. User interface 140 additionally presents interface information to system administrator 20. Specifically, user interface 140 provides system administrator 20 with a list of components and their associated IP and MAC addresses.

User interface 140 also allows system administrator 20 to define other custom requirements. For example, system administrator 20 may define one or more attributes and add those attributes to the list of node attributes presented to system administrator 20.

Figure 10:
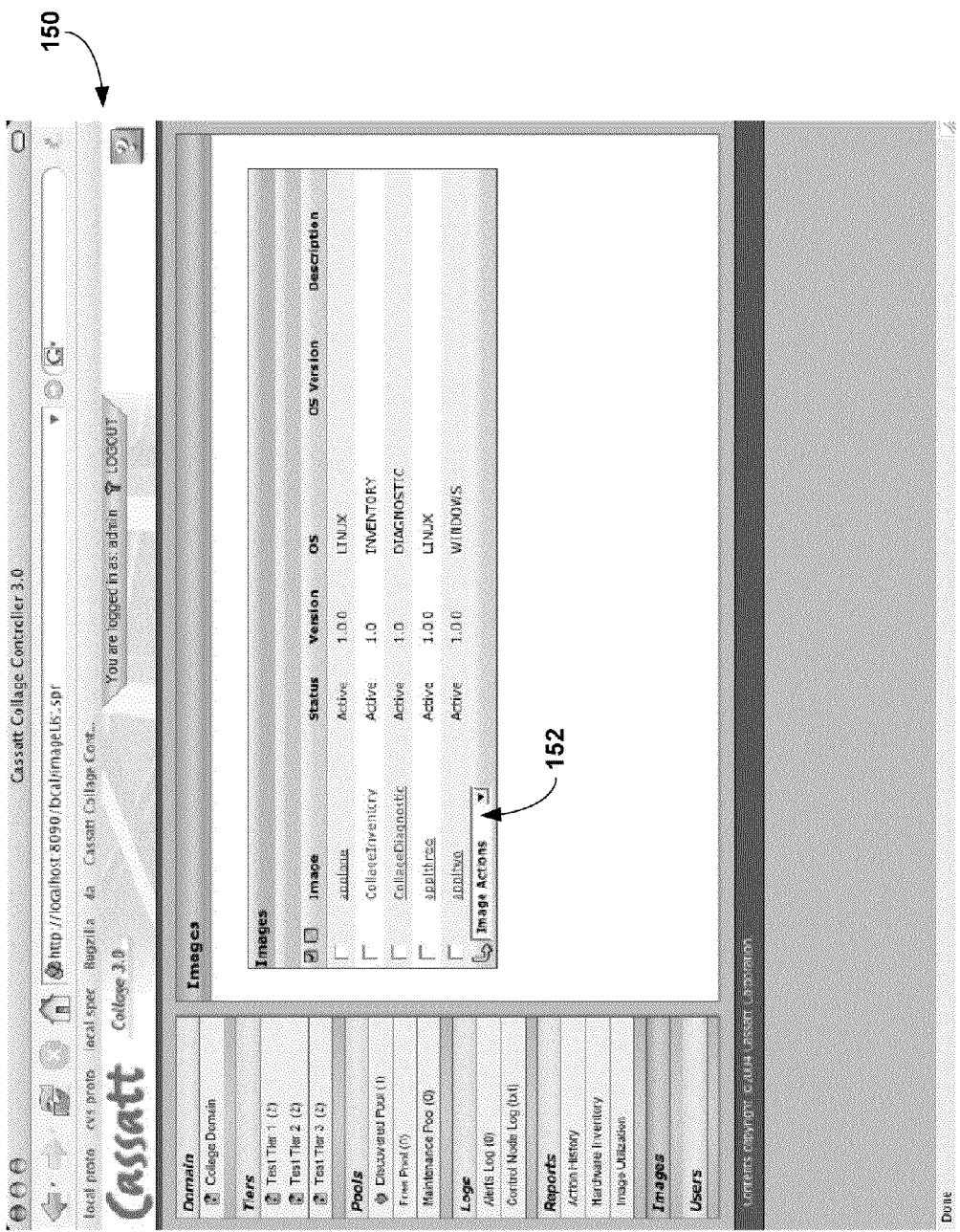
FIG. 10 is a screen illustration of an exemplary user interface for viewing software images.

FIG. 10 is a screen illustration of an exemplary user interface 150 for viewing software images. User interface 150 presents to a system administrator or another user a list of images maintained by control node 12 within image repository 26. The image list further includes the status of each image (i.e., either active or inactive), the version of the image, the operating system on which the image should be run, the operating system version on which the image should be run and a brief description of the image.

System administrator 20 or another user may select an image by clicking on the box in front of the image identifier/name and perform one or more actions on the image. Actions that system administrator 20 may perform on an image include deleting the image, updating the image, and the like. System administrator 20 may select one of the image actions via dropdown menu 152. In some embodiments, user interface 150 may further display other details about the images such as the node to which the images are assigned (if the node status is "active"), the network address associated with the images and the like.

Figure 11:
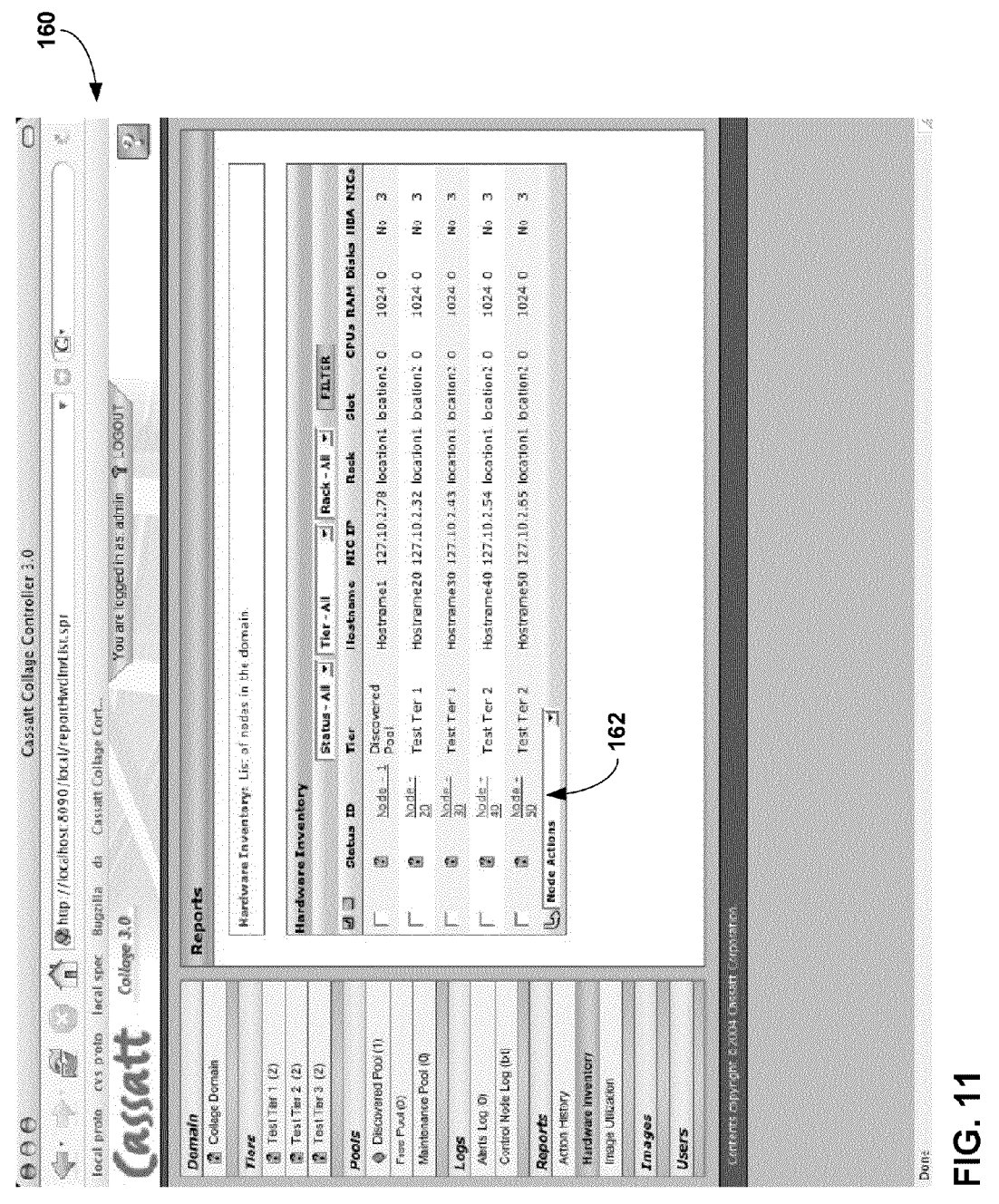

FIG. 11 is a screen illustration of an exemplary user interface 160 for viewing a hardware inventory report. User interface 160 presents to system administrator 20 or another user a list of the nodes that are currently assigned to a domain. System administrator 20 may elect to view the nodes for the entire domain, for a single tier within the domain or for a single rack within a tier.

For each node, user interface 160 presents a node ID, a status of the node, the tier to which the node belongs, a hostname associated with the node, a NIC IP address, a rack location, a slot location, the number of CPU's of the node, the amount of RAM on the node, the number of disks on the node, whether the node has I/O HBA, and the number of NICs of the node.

System administrator 20 or other user may select a node by clicking on the box in front of the node identifier/name and perform one or more actions on the node. Actions that system administrator 20 may perform on the node include deleting the node, updating the node attributes or other properties of the node, and the like. System administrator 20 may select one of the node actions via dropdown menu 162.

Figure 12:
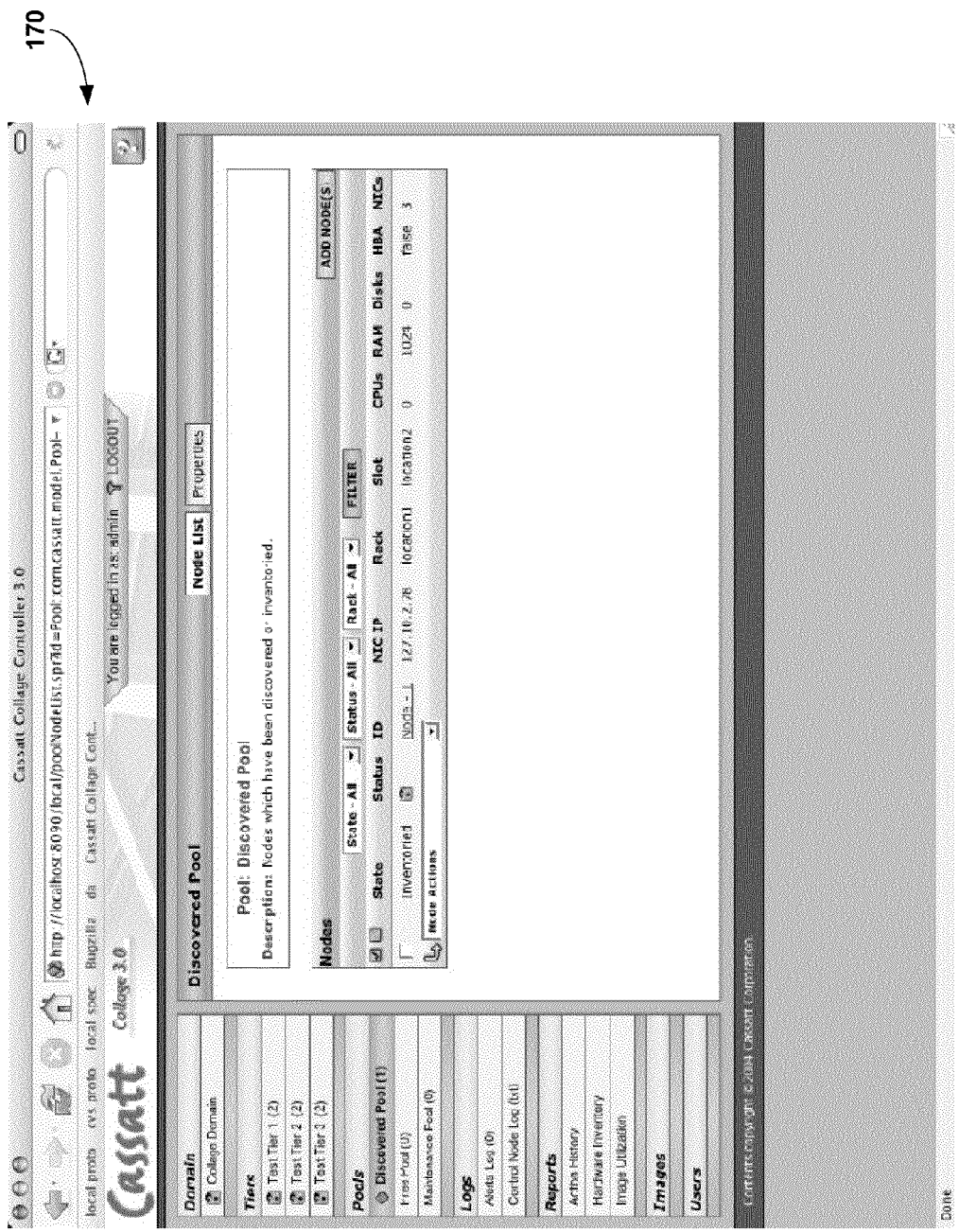
FIG. 12 is a screen illustration of an exemplary user interface for viewing discovered nodes that are located in the free pool.

FIG. 12 is a screen illustration of an exemplary user interface 170 for viewing discovered nodes that are located in discovered pool 11. For each node, user interface 170 presents a node ID, a state of the node, a NIC IP address, a rack location, a slot location, the number of CPU's of the node, the amount of RAM on the node, the number of disks on the node, whether the node has I/O HBA, and the number of NICs of the node.

Figure 13:
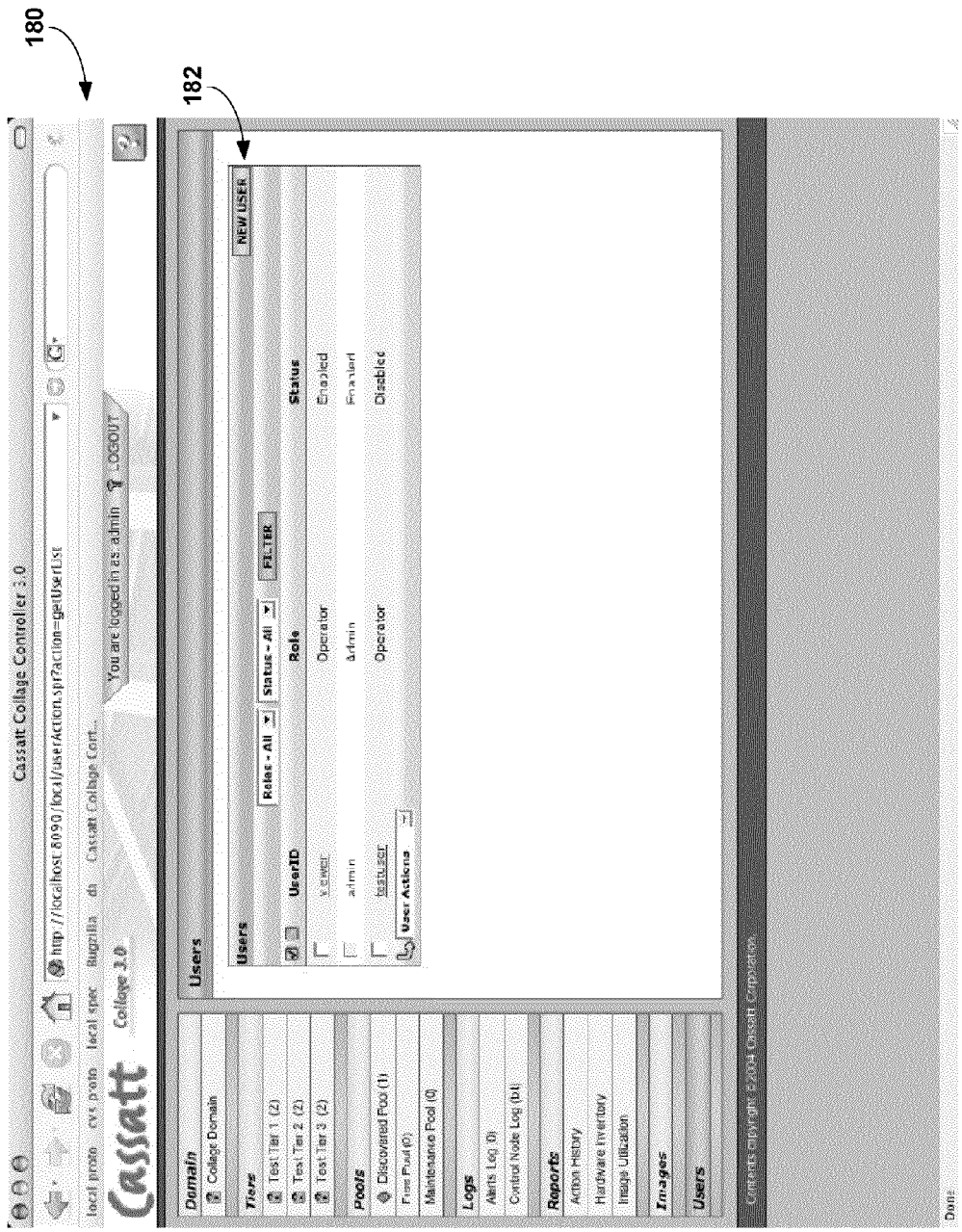
FIG. 13 is a screen illustration of an exemplary user interface for viewing users of a distributed computing system.

FIG. 13 is a screen illustration of an exemplary user interface 180 for viewing users of distributed computing system 10. User interface 180 presents a list of users as well as the role assigned to each of the users and the status of each of the users. Thus, system administrator 20 may define different roles to each of the users. For example, a user may be either an operator (i.e., general user) or an administrator. System administrator 20 may add a new user to the list of users by clicking on the "New User" button 182.

Figure 14:
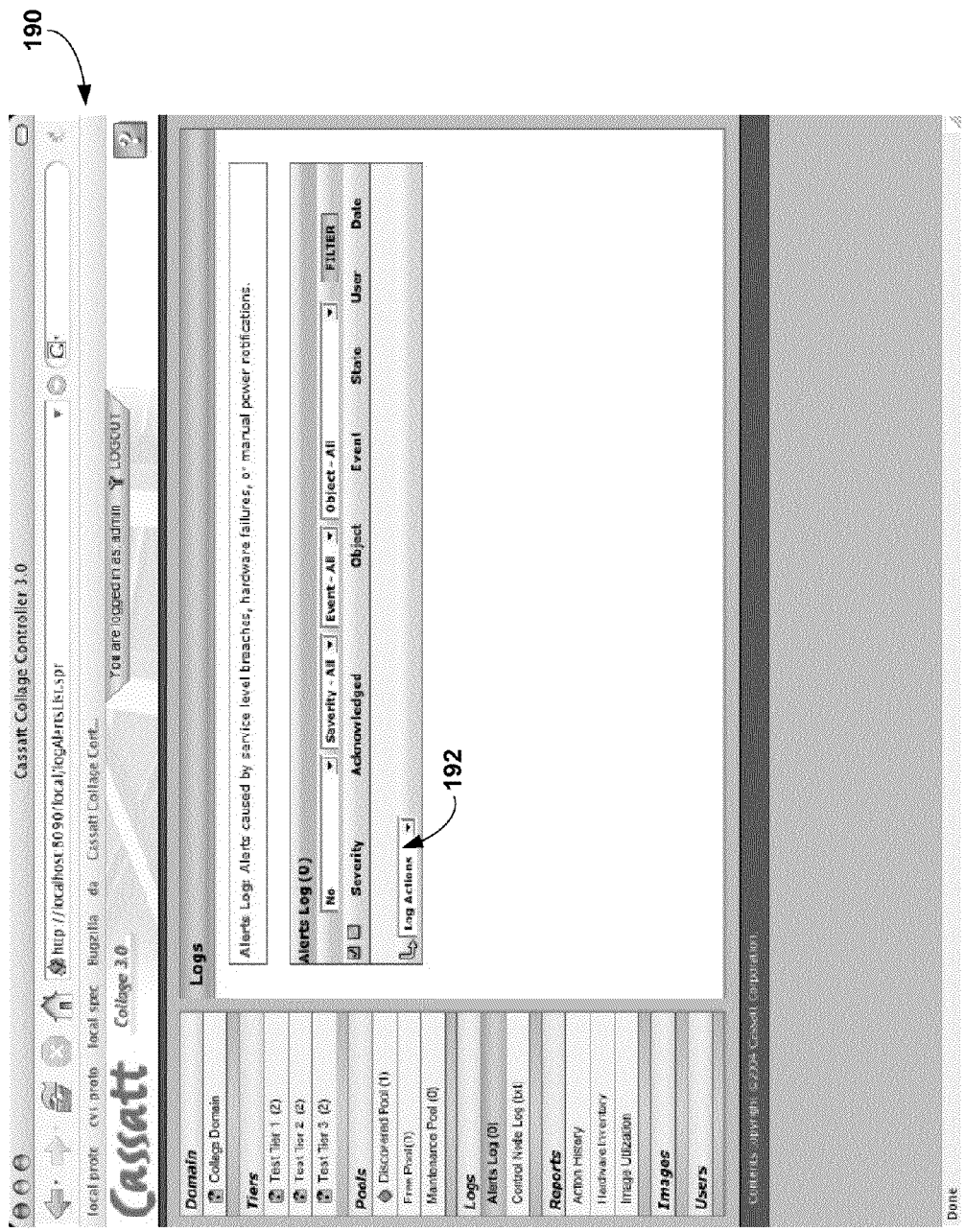
FIG. 14 is a screen illustration of an exemplary user interface for viewing alerts for the distributed computing system.

FIG. 14 is a screen illustration of an exemplary user interface 190 for viewing alerts for distributed computing system 10. For each of the alerts, user interface 190 identifies the severity of the alert, whether the alert has been acknowledged, an object associated with the alert, an event associated with the alert, a state of the alert, a user associated with the alert and a date associated with the alert.

System administrator 20 or other user may select an alert by clicking on the box in front of the logged alert and perform one or more actions on the logged alert. Actions that system administrator 20 may perform include deleting the alert, changing the status of the alert, or the like. System administrator 20 may specify the log actions via dropdown menu 192.

Figure 15:
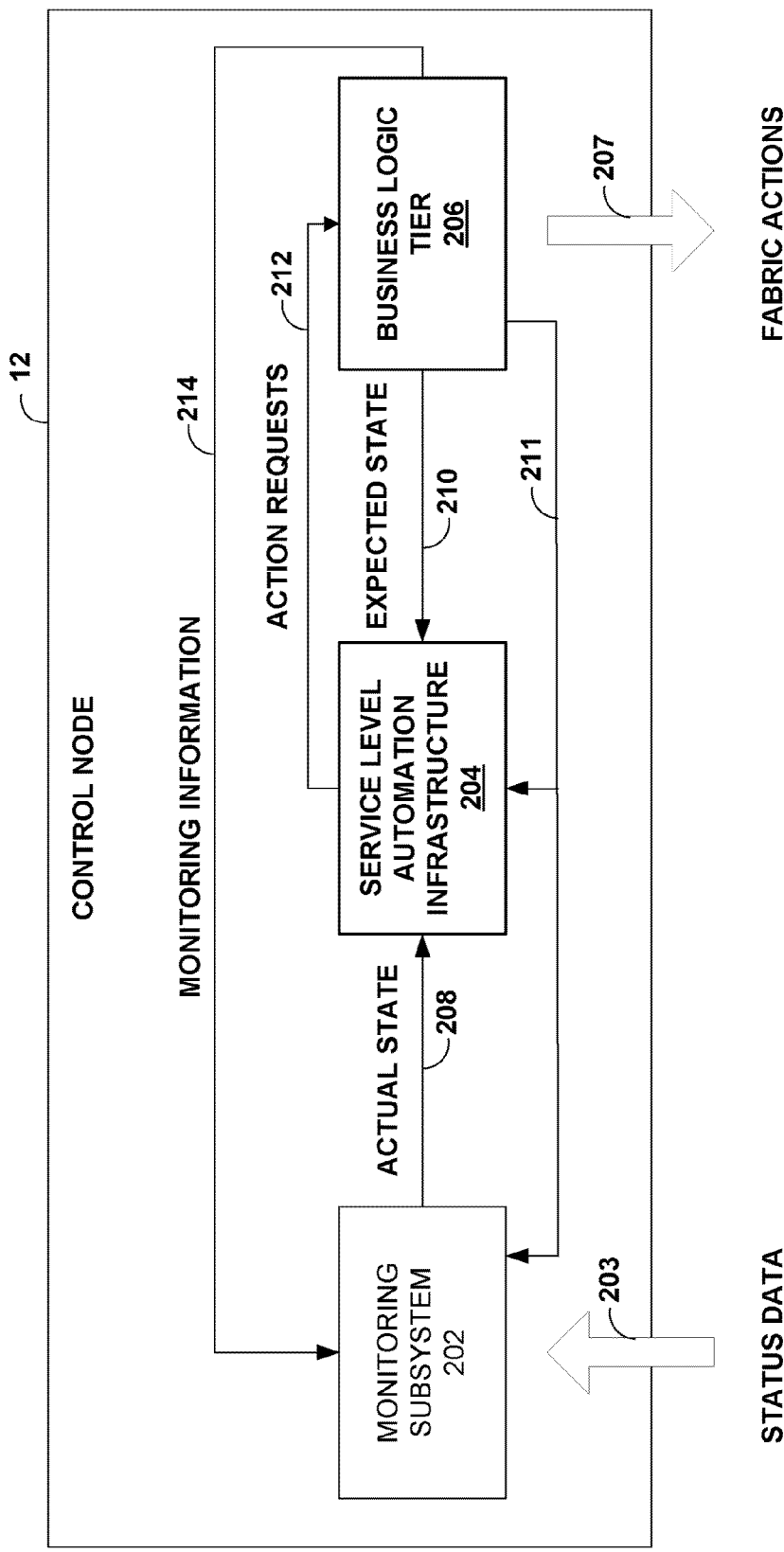
FIG. 15 is a block diagram illustrating one embodiment of control node that includes a monitoring subsystem, a service level automation infrastructure (SLAI), and a business logic tier (BLT).

FIG. 15 is a block diagram illustrating one embodiment of control node 12 in further detail. In the illustrated example, control node 12 includes a monitoring subsystem 202, a service level automation infrastructure (SLAI) 204, and a business logic tier (BLT) 206.

Monitoring subsystem 202 provides real-time monitoring of the distributed computing system 10. In particular, monitoring subsystem 202 dynamically collects status data 203 from the hardware and software operating within distributed computing system 10, and feeds the status data in the form of monitor inputs 208 to SLAI 204. Monitoring inputs 208 may be viewed as representing the actual state of the fabric defined for the organizational model implemented by distributed computing system 10. Monitoring subsystem 202 may utilize well defined interfaces, e.g., the Simple Network Management Protocol (SNMP) and the Java Management Extensions (JMX), to collect and export real-time monitoring information to SLAI 204.

SLAI 204 may be viewed as an automation subsystem that provides support for autonomic computing and acts as a central nervous system for the controlled fabric. In general, SLAI 204 receives monitoring inputs 208 from monitoring subsystem 202, analyzes the inputs and outputs appropriate action requests 212 to BLT 206. In one embodiment, SLAI 204 is a cybernetic system that controls the defined fabric via feedback loops. More specifically, administrator 20 may interact with BLT 206 to define an expected state 210 for the fabric. BLT 206 communicates expected state 210 to SLAI 204. SLAI 204 receives the monitoring inputs from monitoring subsystem 202 and applies rules to determine the most effective way of reducing the differences between the expected and actual states for the fabric.

For example, SLAI 204 may apply a rule to determine that a node within a high priority tier has failed and that the node should be replaced by harvesting a node from a lower priority tier. In this example, SLAI 204 outputs an action request 212 to invoke BLT 206 to move a node from one tier to the other.

In general, BLT 206 implements high-level business operations on fabrics, domains and tiers. SLAI 204 invokes BLT 206 to bring the actual state of the fabric into accordance with the expected state. In particular, BLT 206 outputs fabric actions 207 to perform the physical fabric changes. In addition, BLT 206 outputs notifications 211 to SLAI 204 and monitoring subsystem 202 to indicate the changes to distributed computing system 10, and communicates a new expected state 210 to SLAI 204. As one example, BLT 206 may provide control operations that can be used to replace failed nodes. For example, BLT 206 may output an action request indicating that a node having address 10.10.10.10 has been removed from tier ABC and a node having address 10.10.10.11 has been added to tier XYZ. In response, monitoring subsystem 202 stops attempting to collect status data 203 from node 10.10.10.10 and starts monitoring for status data from node 10.10.10.11. In addition, SLAI 204 updates an internal model to automatically associate monitoring inputs from node 10.10.10.11 with tier XYZ.

Figure 16:
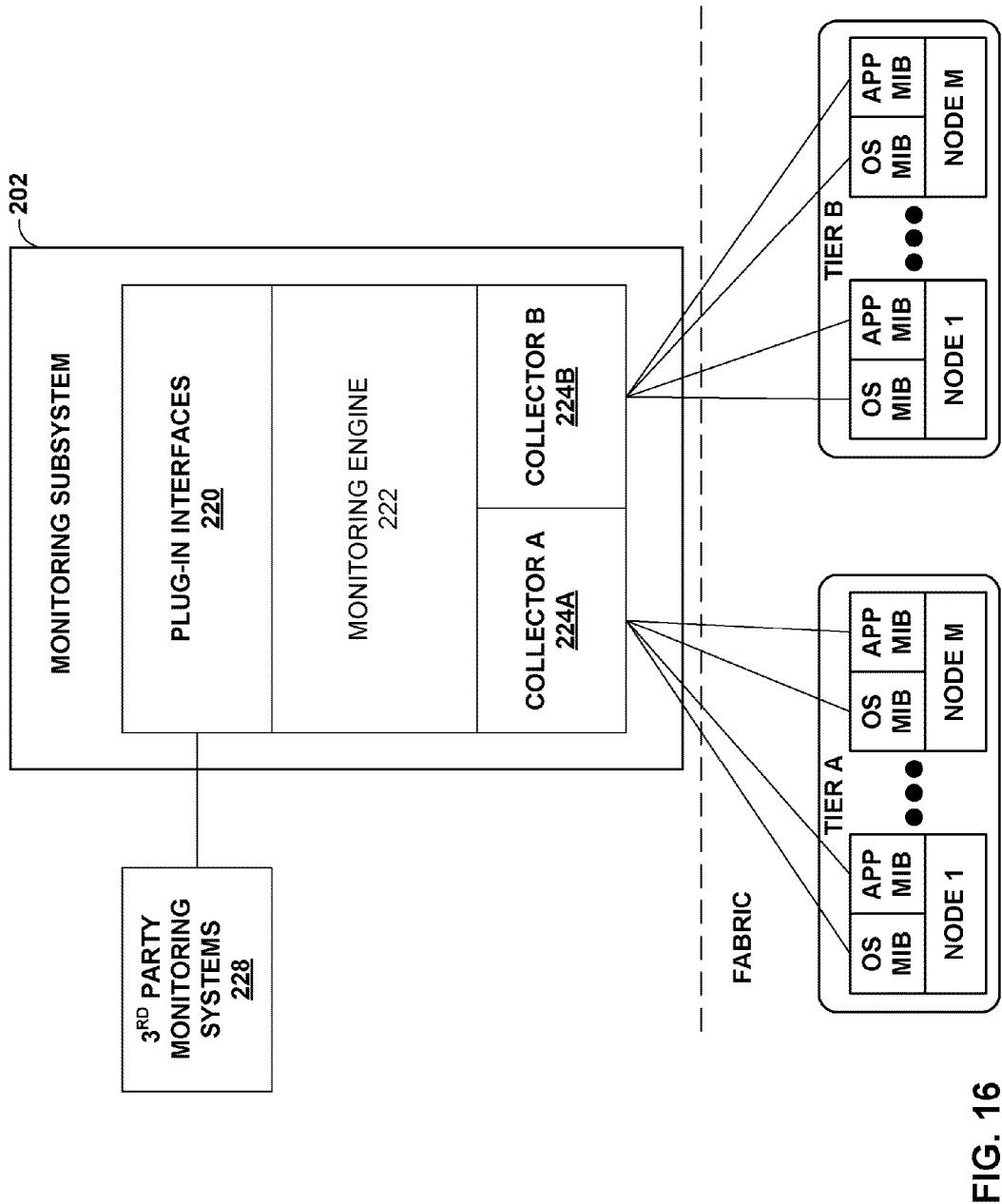
FIG. 16 is a block diagram illustrating one embodiment of the monitoring subsystem.

FIG. 16 is a block diagram illustrating one embodiment of monitoring subsystem 202. In general, monitoring subsystem 202 dynamically detects and monitors a variety of hardware and software components within the fabric. For example, monitoring subsystem 202 identifies, in a timely and efficient manner, any computing nodes that have failed, i.e., any node that does not respond to a request to a known service. More generally, monitoring subsystem 202 provides a concise, consistent and constantly updating view of the components of the fabric.

As described further below, monitoring subsystem 202 employs a modular architecture that allows new detection and monitoring collectors 224 to be "plugged-in" for existing and new protocols and for existing and new hardware and software. As illustrated in FIG. 16, monitoring subsystem 202 provides a plug-in architecture that allows different information collectors 224 to be installed. In general, collectors 224 are responsible for protocol-specific collection of monitoring information. The plug-in architecture allows for new protocols to be added by simply adhering to a collector plug-in signature. In this example, monitoring subsystem 202 includes collectors 224A and 224B for collecting information from operating systems and applications executing on nodes within tier A and tier B, respectively.

In one embodiment, collectors 224 are loaded at startup of control node 12 and are configured with information retrieved from BLT 206. Monitoring engine 222 receives collection requests from SLAI 204, sorts and prioritizes the requests, and invokes the appropriate one of collectors 224 based on the protocol specified in the collection requests. The invoked collector is responsible for collecting the required status data and returning the status data to monitoring engine 222. If the collector is unable to collect the requested status data, the collector returns an error code.

In one embodiment, collectors 224 are Java code compiled into a jar file and loaded with a class loader at run time. Each of collectors 224 has an associated configuration file written in a data description language, such as the extensible markup language (XML). In addition, a user may interact with BLT 206 to add run-time configuration to dynamically configure collectors 224 for specific computing environments. Each of collectors 224 expose an application programming interface (API) to monitoring engine 222 for communication and data exchange.

A user, such as a system administrator, specifies the protocol or protocols to be used for monitoring a software image when the image is created. In addition, the users may specify the protocols to be used for monitoring the nodes and each service executing on the nodes. Example protocols supported by the collectors 224 include Secure Shell (SSH), Simple Network Management Protocol (SNMP), Internet Control Message Protocol (ICMP) ping, Java Management Extensions (JMX) and the Hypertext Transfer Protocol (HTTP).

Some protocols require special privileges, e.g., root privileges, to perform the required data collection. In this case, the corresponding collectors 224 communicate with a separate process that executes as the root. Moreover, some protocols may require deployment and/or configuration of data providers within the fabric. Software agents may, for example, be installed and configured on nodes and configured on other hardware. If needed, custom in-fabric components may be deployed.

In this example, the modular architecture of monitoring subsystem 202 also supports one or more plug-in interfaces 220 for data collection from a wide range of third-party monitoring systems 228. Third-party monitoring systems 228 monitor portions of the fabric and may be vendor-specific.

Figure 17:
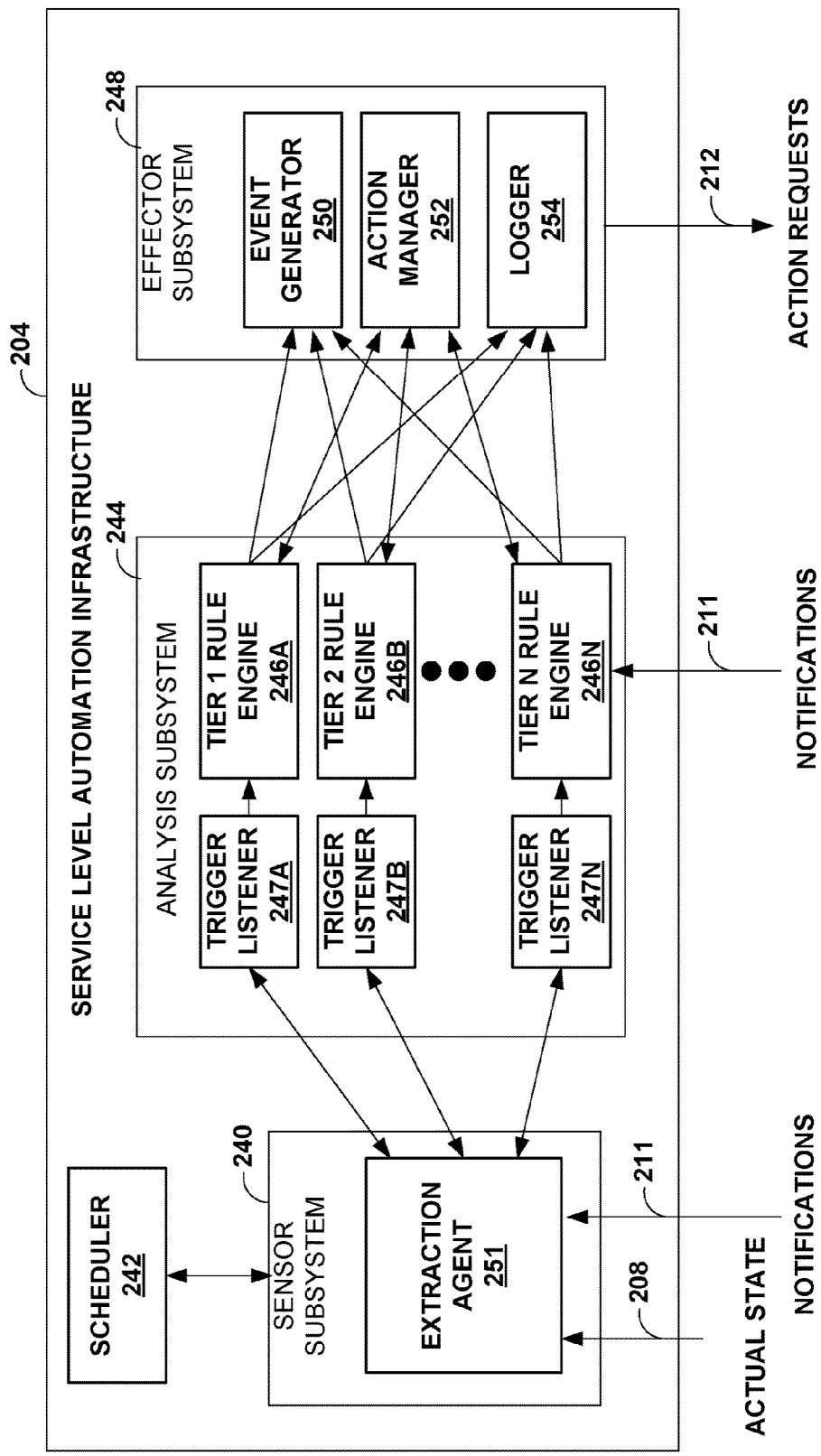
FIG. 17 is a block diagram illustrating one embodiment of the SLAI in further detail.

FIG. 17 is a block diagram illustrating one embodiment of SLAI 204 in further detail. In the illustrated embodiment, SLAI 204 is composed of three subsystems: a sensor subsystem 240, an analysis subsystem 244 and an effector subsystem 248.

In general, sensor subsystem 240 receives actual state data from monitoring subsystem 202 in the form of monitoring inputs 208 and supplies ongoing, dynamic input data to analysis subsystem 244. For example, sensor subsystem 240 is notified of physical changes to distributed computing system 10 by monitoring subsystem 202. Sensor subsystem 240 uses the state data received from monitoring subsystem 202 to maintain ongoing, calculated values that can be sent to analysis subsystem 244 in accordance with scheduler 242.

In one embodiment, sensor subsystem 240 performs time-based hierarchical data aggregation of the actual state data in accordance with the defined organization model. Sensor subsystem 240 maintains organizational data in a tree-like structure that reflects the current configuration of the hierarchical organization model. Sensor subsystem 240 uses the organizational data to perform the real-time data aggregation and map tiers and domains to specific nodes. Sensor subsystem 240 maintains the organizational data based on notifications 211 received from BLT 206.

Sensor subsystem 240 sends inputs to analysis subsystem 244 to communicate the aggregated data on a periodic or event-driven basis. Analysis subsystem 244 may register an interest in a particular aggregated data value with sensor subsystem 240 and request updates at a specified frequency. In response, sensor subsystem 240 interacts with monitoring subsystem 202 and scheduler 242 to generate the aggregated data required by analysis subsystem 244.

Sensor subsystem 240 performs arbitrary data aggregations via instances of plug-in classes (referred to as "triggers") that define the aggregations. Each trigger is registered under a compound name based on the entity being monitored and the type of data being gathered. For example, a trigger may be defined to aggregate and compute an average computing load for a tier every five minutes. Analysis subsystem 244 requests the aggregated data based on the registered names. In some embodiments, analysis subsystem 244 may define calculations directly and pass them to sensor subsystem 240 dynamically.

Analysis subsystem 244 is composed of a plurality of forward chaining rule engines 246A-246N. In general, rule engines 246 match patterns in a combination of configuration data and monitoring data, which is presented by extraction agent 251 in the form of events. Events contain the aggregated data values that are sent to rule engines 246 in accordance with scheduler 242.

Sensor subsystem 240 may interact with analysis subsystem 244 via trigger listeners 247 that receives updates from a trigger within sensor subsystem 240 when specified events occur. An event may be based on system state (e.g., a node transitioning to an up or down state) or may be time based.

Analysis subsystem 244 allows rule sets to be loaded in source form and compiled at load time into discrimination networks. Each rule set specifies trigger-delivered attributes. Upon loading the rule sets, analysis subsystem 244 establishes trigger listeners 247 to receive sensor notifications and update respective working memories of rule engines 246. As illustrated in FIG. 17, each of rule engines 246 may serve a different tier defined within the fabric. Alternatively, multiple rule engines 246 may serve a single tier or a single rule engine may serve multiple tiers.

Rule engines 246 process the events and invoke action requests via calls to effector subsystem 248. In addition, rule engines 246 provide a call-back interface so that effector subsystem 248 can inform a rule engine when an action has completed. Rule engines 246 prevent a particular rule from re-firing as long as any action invoked by the rule has not finished. In general, rules contain notification calls and service invocations though either may be disabled by configuration of effector subsystem 248. BLT 206 supplies initial system configuration descriptions to seed each of rule engines 246.

In general, rule engines 246 analyze the events and discover discrepancies between an expected state of the fabric and an actual state. Each of rule engines 246 may be viewed as software that performs logical reasoning using knowledge encoded in high-level condition-action rules. Each of rule engines 246 applies automated reasoning that works forward from preconditions to goals defined by system administrator 20. For example, rule engines 246 may apply modus ponens inferences rules.

Rule engines 246 output requests to effector module 248 which produce actions requests 212 for BLT 206 to resolve the discrepancies. Effector subsystem 248 performs all operations on behalf of analysis subsystem 244. For example, event generator 250, action manager 252 and logger 254 of effector subsystem 248 perform event generation, BLT action invocation and rule logging, respectively.

Figure 18:
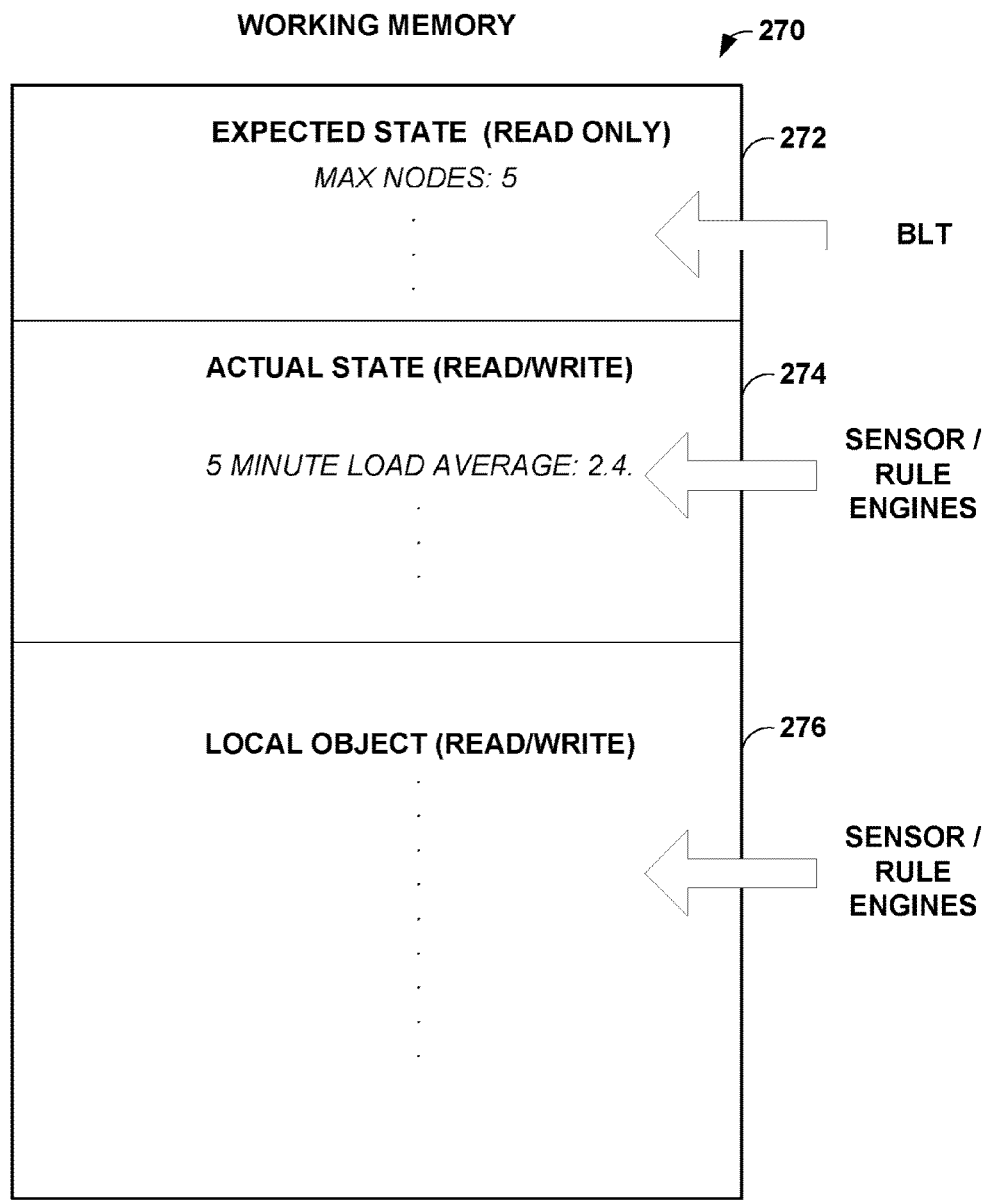
FIG. 18 is a block diagram of an example working memory associated with rule engines of the SLAI.

FIG. 18 is a block diagram of an example working memory 270 associated with rule engines 246. In this example, working memory 270 includes a read-only first data region 272 that stores the expected state received from BLT 206. Data region 272 is read-only in the sense that it cannot be modified in response to a trigger from sensor subsystem 240 or by rule engines 246 without notification from BLT 206.

In addition, working memory 270 includes a second data region 274 that is modifiable (i.e., read/write) and may be updated by monitoring subsystem 202 or used internally by rule engines 246. In general, data region 274 stores aggregated data representing the actual state of the fabric and can be updated by sensor subsystem 240 or by rule engines 246. The actual state may consist of a set of property annotations that can be attached to objects received from BLT 206 or to objects locally defined within a rule engine, such as local object 276.

Figure 19:
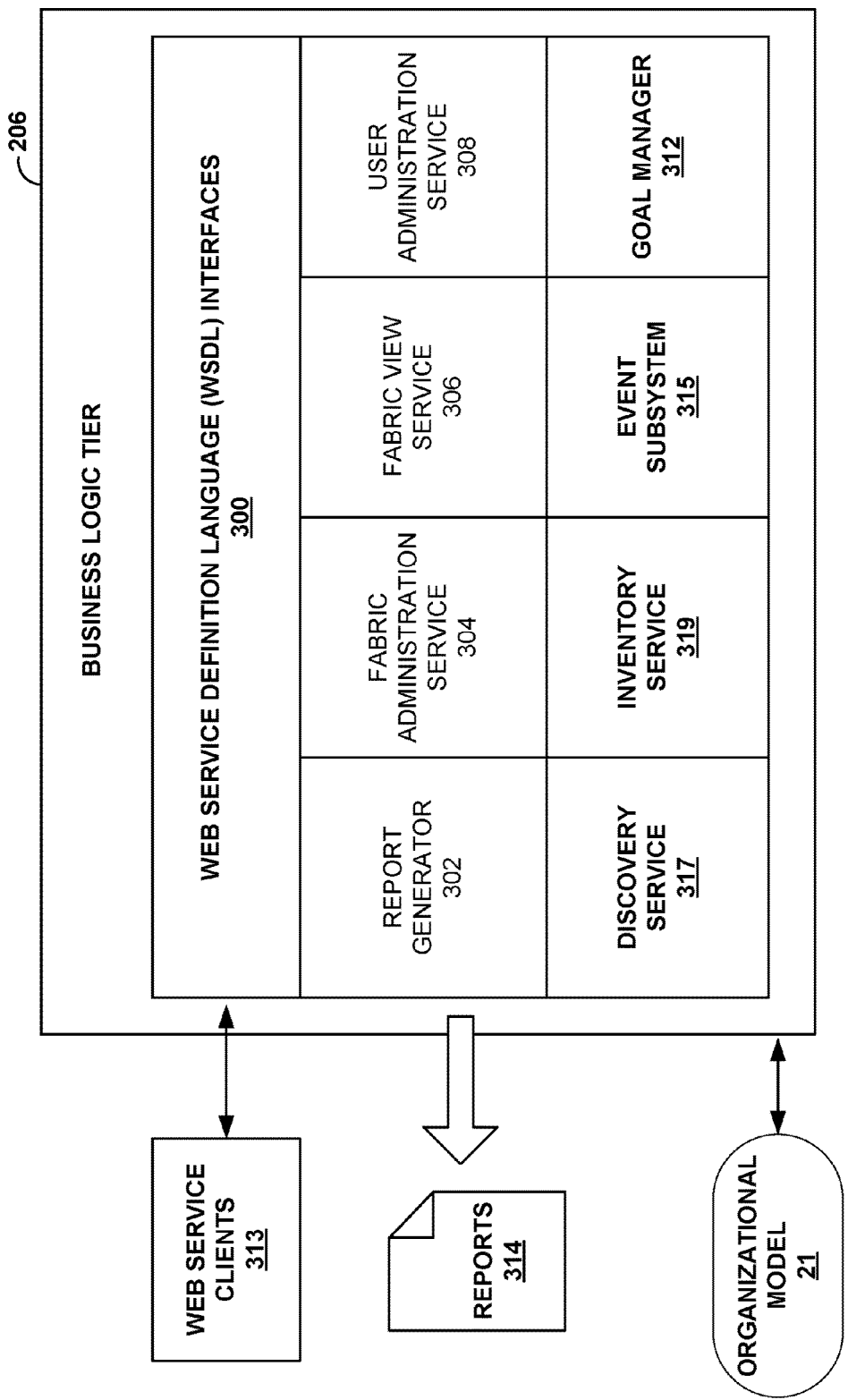
FIG. 19 is a block diagram illustrating an example embodiment for the BLT of the control node.

FIG. 19 is a block diagram illustrating an example embodiment for BLT 206. In this example, BLT 206 includes a set of one or more web service definition language (WSDL) interfaces 300, a report generator 302, a fabric administration interface service 304, a fabric view service 306, a user administration service 308, a goal manager 312 and an event subsystem 315.

As described, BLT 206 provides the facilities necessary to create and administer the organizational model (e.g., fabric, domains, tiers and nodes) implemented by distributed computing system 10. In general, BLT 206 abstracts access to the persisted configuration state of the fabric, and controls the interactions with interfaces to fabric hardware services. As such, BLT 206 provides fabric management capabilities, such as the ability to create a tier and replace a failed node. WSDL interfaces 300 provide web service interfaces to the functionality of BLT 206 that may be invoked by web service clients 313. In general, web service clients 313 may be presentation layer applications, command line applications or internal subsystems, such as SLAI 204.

In other words, BLT 206 abstracts all interaction with physical hardware for web service clients 313. BLT 206 is an enabling component for autonomic management behavior, but does not respond to real-time events that either prevent a goal from being achieved or produce a set of deviations between the expected state and the actual state of the system. In contrast, BLT 206 originates goals for autonomic reactions to changing configuration and state. SLAI 204 analyzes and acts upon these goals along with real-time state changes. BLT 206 sets the goals to which SLAI 204 strives to achieve, and provides functionality used by the SLAI in order to achieve the goals.

In general, BLT 206 does not dictate the steps taken in pursuit of a goal since these are likely to change based on the current state of distributed computing system 10 and changes to configurable policy. SLAI 204 makes these decisions based on the configured rule sets for the fabric and by evaluating monitoring data received from monitoring subsystem 202.

Fabric administration service 304 implements a set of methods for managing all aspects of the fabric. Example methods include methods for adding, viewing, updating and removing domains, tiers, nodes, notifications, assets, applications, software images, connectors, and monitors. Other example methods include controlling power at a node, and cloning, capturing, importing, exporting or upgrading software images. Rule engines 246 of SLAI 204 may, for example, invoke these methods by issuing action requests 212.

Many of WSDL interfaces 300 offered by BLT 206 allow administrator 20 to define goals, such as specifying a goal of the expected state of the fabric. For these, goal manager 312 generates goal data 310 that represents the specified goal. Goal manager 312 returns a goal identifier to the calling web service clients 313. The web service clients 313 in turn notify SLAI 204 of the expected goal and pass the goal identifier to the SLAI. Rule engines 246 within SLAI 204, in turn, initiate one or more BLT tasks to achieve the specified goal. Web service clients 313 use the goal identifier to track progress and retrieve output, results, and errors associated with achieving the goal.

In one embodiment, there are no WSDL interfaces 300 for initiating specific tasks. Rather, administrator 20 interacts with BLT 206 though goal interfaces presented by WSDL interfaces 300 to define the goals for the fabric. In contrast, the term task is used to refer to internal system constructs that require no user interaction. Tasks are distinct, low-level units of work that affect the state of the fabric. SLAI 204 may combine tasks to achieve or maintain a goal state.

For example, administrator 20 can request configuration changes by either adding new goals to an object or by modifying the attributes on existing goals. Scheduled goals apply a configuration at a designated time. For example, the goals for a particular tier may specify the minimum, maximum, and target node counts for that tier. As a result, the tier can increase or decrease current node capacity by scheduling goals with different configuration values.

This may be useful, for example, in scheduling a software image upgrade. As another example, entire domains may transition online and offline per a defined grid schedule. Administrator 20 may mix and match goals on a component to achieve configurations specific to the application and environment. For example, a tier that does not support autonomic node replacement would not be configured with a harvesting goal.

In general, goals are either "in force" or "out of force." SLAI 204 only works to achieve and maintain those goals that are currently in force. SLAI 204 also applies a concept of "gravity" as the goals transition from in force to out of force. For example, SLAI 204 may transition a tier offline when an online goal is marked out of force. Some goal types may have prerequisite goals. For example, an image upgrade goal may require as a prerequisite that a tier be transitioned to offline before the image upgrade can be performed.

Goal manager 312 may automatically formulate dependencies between goals or may allow a user to specify the dependencies. For example, a user may request that a newly created tier come online, and goal manager 312 may automatically generate a goal of harvesting a target number of nodes to enable the tier. If a goal, along with all of the goals on which it depends, cannot be satisfied within a user-specified time, goal manager 312 changes the state of the goal to out of force and notifies the user of the failure.

In this manner, goal manager 312 controls the life cycle of a goal (i.e., the creation, scheduling, update, deletion of the goal), and provides a common implementation of these and other services such as timeout, event writing, goal conflicts, management of intra-goal dependencies, and tracking tasks to achieving the goals.

Progress toward a goal is tracked though event subsystem 315. In particular, event subsystem tracks the progress of each in force goal based on the goal identifiers. Tasks executed to achieve a particular goal produce events to communicate result or errors. The events provide a convenient time-based view of all actions and behaviors.

Examples of goal types that may be defined by administrator 20 include software image management goals, node allocation goals, harvest goals, tier capacity goals, asset requirement goals, tier online/offline goals, and data gathering goals.

In one embodiment, BLT 206 presents a task interface to SLAI 204 for the creation and management of specific tasks in order to achieve the currently in force goals. In particular, rule engines 246 invoke the task interface based on evaluation of the defined rule sets in view of the expected state and actual state for the fabric. Example task interfaces include interfaces to: reserve node resources; query resources for a node slot; associate or disassociate an image with a node in a tier node slot; allocate, de-allocate, startup or shutdown a node; move a node to a tier; apply, remove or cycle power of a node; create a golden image; create or delete an image instance; and delete an activity, node or tier.

Report generator 302 provides an extensible mechanism for generating reports 314. Typical reports include image utilization reports that contain information with respect to the number of nodes running each software image, inventory reports detailing both the logical and physical aspects of the fabric, and system event reports showing all events that have occurred within the fabric. Report generator 302 gathers, localizes, formats and displays data into report form for presentation to the user. Report generator 302 may include one or more data gathering modules (not shown) that gather events in accordance with a schedule and update an events table to record the events. The data gathering modules may write the events in XML format.

As described further below, discovery service 317 detects the connection of nodes to network 18 (FIG. 1). For example, discovery service 317 may monitor DHCP leases assigned within network 18 to detect the addition of nodes to network 18. Once detected, discovery service 317 updates organizational model 21 to include a node object for the discovered node and allocates the node to discovered pool 11.

Inventory service 319 automatically inventories the attributes for the discovered node and reassigns the discovered node to free pool 13. In general, the node attributes identified during the inventory process may be hardware, software or firmware attributes of the node. However, in most applications, the node attributes include mainly hardware attributes. As described in further detail below, inventory service 319 may automatically deploy an "inventory software image" for inventorying the hardware assets of the node. Thus, this image may primarily be the only software assets deployed on the node. Example hardware attributes include a number of processors (CPU count), a processing speed, an amount of random access memory (e.g., RAM), local disk characteristics, I/O attributes (e.g, whether the node includes HBA) or other computing resources. Administrator 20 may interact with BLT 206 and provide input identifying node attributes not detectable via the automatic inventory service 319.

Figure 20:
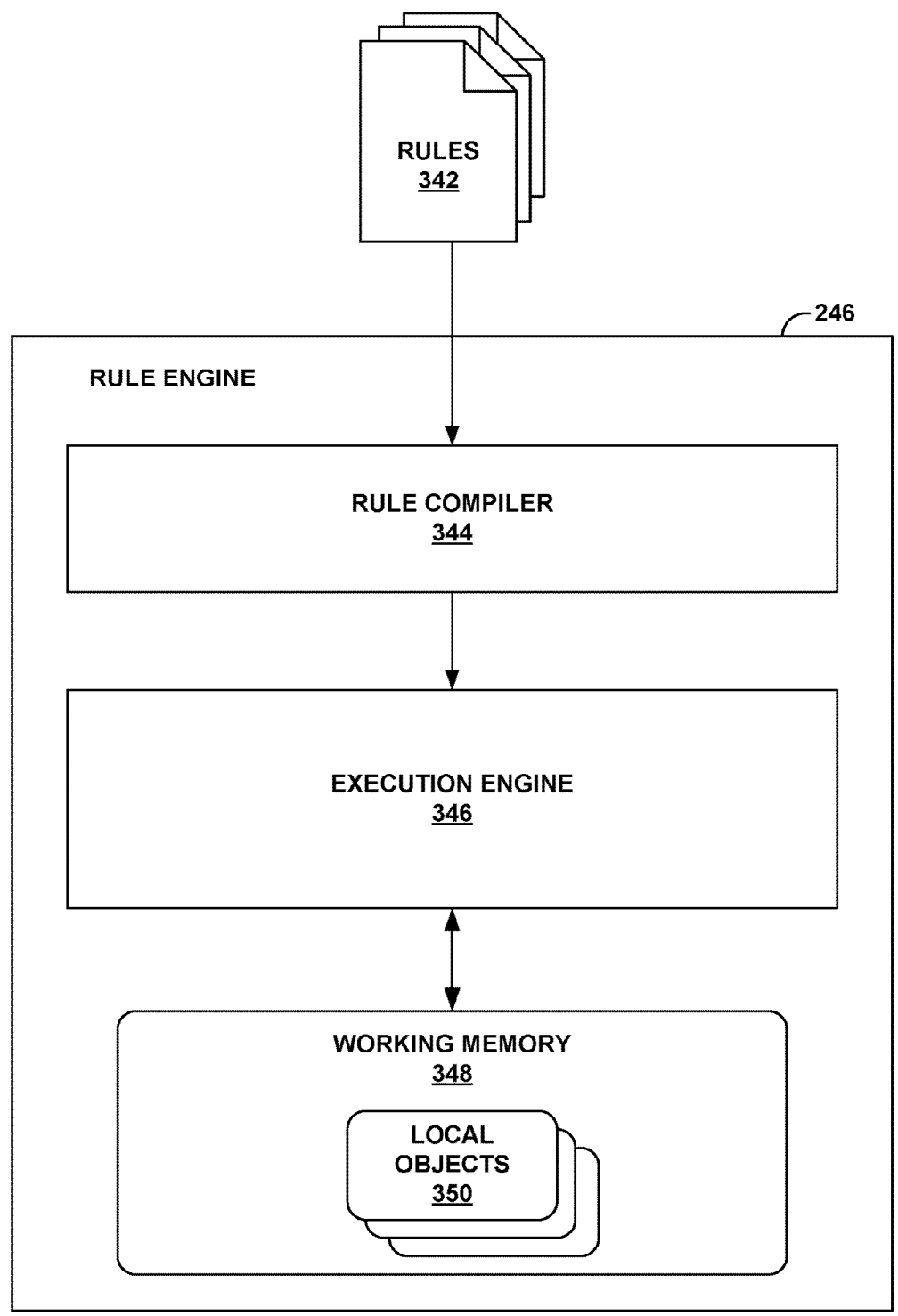
FIG. 20 is a block diagram illustrating one embodiment of a rule engine in further detail.

FIG. 20 is a block diagram illustrating one embodiment of a rule engine 246 (FIG. 17). In the illustrated embodiment, rule engine 246 includes a rule compiler 344 and an execution engine 346. Each of rules 342 represents a unit of code that conforms to a rule language and expresses a set of triggering conditions and a set of implied actions. When the conditions are met, the actions are eligible to occur. The following is one example of a rule:

```
rule checkTierLoad {
    Tier t where status != "overloaded";
    LoadParameter p where app == t.app && maxload < t.load;
} -> {
    modify t {
        status: "overloaded";
    };
}
```

When translated, this example rule marks a tier as overloaded if an application is implemented by the tier and the maximum specified load for the application has been exceeded. Another example rule for outputting a notification that a tier is overloaded and automatically invoking a task within BLT 206 to add a node is:

```
rule tierOverloadNotify {
    Tier t where status == "overloaded";
} -> {
    notify "Tier: " + t + "is overloaded.";
    BLT.addNode(f);
}
```

Rule compiler 344 compiles each of rules 344 and translates match conditions of the rules into a discrimination network that avoids redundant tests during rule execution. Execution engine 346 handles rule administration, object insertion and retrieval, rule invocation and execution of rule actions. In general, execution engine 346 first matches a current set of rules 342 against a current state of working memory 348 and local objects 350. Execution engine 346 then collects all rules that match as well as the matched objects and selects a particular rule instantiation to fire. Next, execution engine 346 fires (executes) the instantiated rule and propagates any changes to working memory 348. Execution engine 346 repeats the process until no more matching rule instantiations can be found.

Firing of a rule typically produces a very small number of changes to working memory 348. This allows sophisticated rule engines to scale by retaining match state between cycles. Only the rules and rule instantiations affected by changes get updated, thereby avoiding the bulk of the matching process. One exemplary algorithm that may be used by execution engine 346 to handle the matching process includes the RETE algorithm that creates a decision tree that combines the patterns in all the rules and is intended to improve the speed of forward-chained rule system by limiting the effort required to re-compute a conflict set after a rule is fired. One example of a RETE algorithm is described in Forgy, C. L.: 1982, 'RETE: a fast algorithm for the many pattern/many object pattern match problem'. Artificial Intelligence 19, 1737, hereby incorporated by reference. Other examples include the TREAT algorithms, and LEAPS algorithm, as described by Miranker, D. P.: 'TREAT: A New and Efficient Match Algorithm for AI Production Systems'. ISBN 0934613710 Daniel P. Miranker, David A. Brant, Bernie Lofaso, David Gadbois: On the Performance of Lazy Matching in Production Systems. AAAI 1990: 685692, each of which is hereby incorporated by reference.

Figure 21:
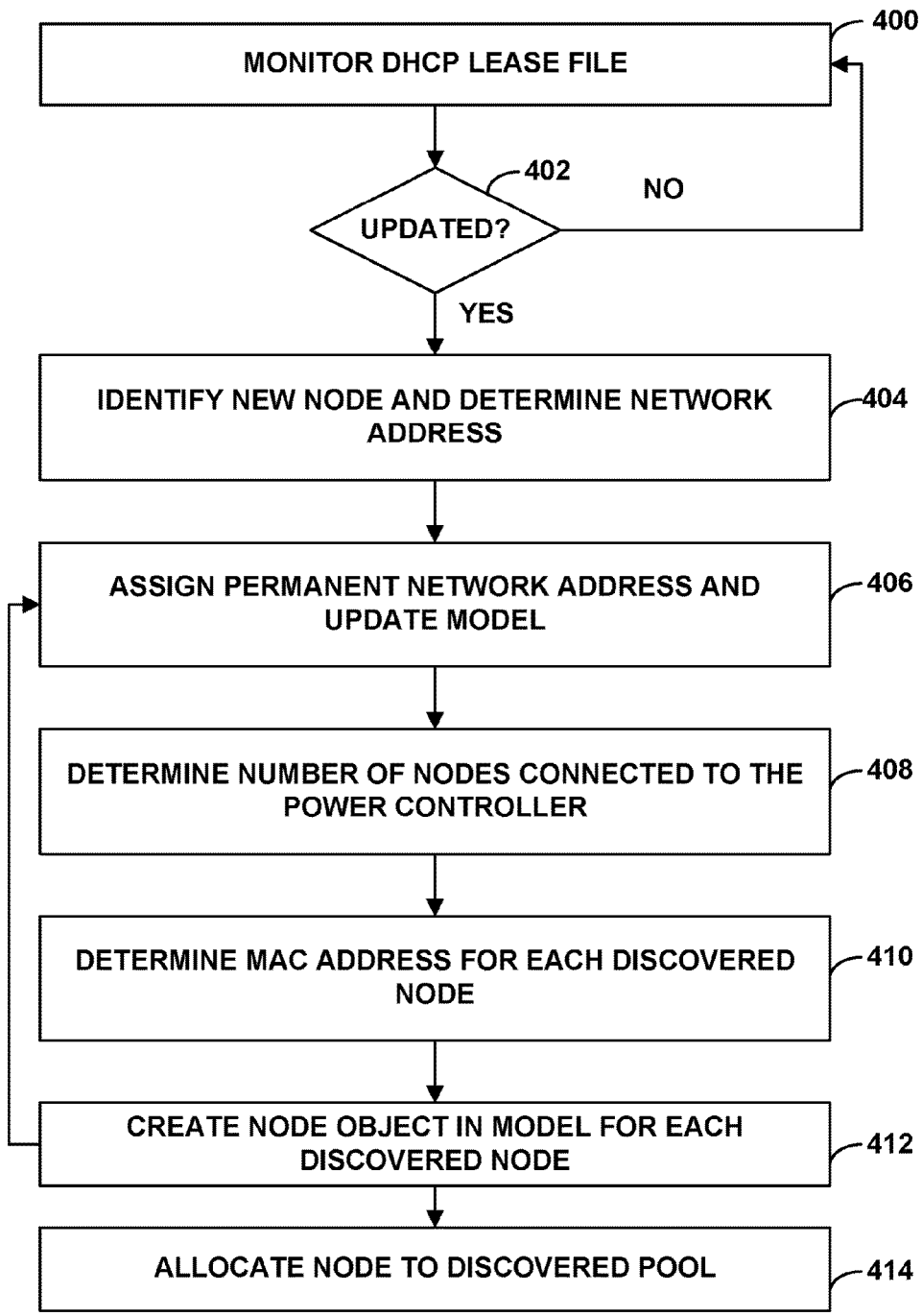
FIG. 21 is a flow diagram illustrating exemplary operation of a discovery service that automatically discovers candidate application nodes of the distributed computing system.

FIG. 21 is a flow diagram illustrating exemplary operation of discovery service 317 when automatically discovering an application node. In general, discovery service 317 detects newly available nodes when connected or otherwise added to network 18 (FIG. 1). Discovery service 317 may execute as a background daemon that monitors a DHCP lease file and identifies DHCP leases assigned by a DHCP server within network 18 (400). The DHCP server may be a conventional DHCP server and may execute on control node 12 or elsewhere within network 18.

In the event the DHCP lease file has been updated by the DHCP server (402), discovery service 317 parses any new DHCP lease to determine whether the requesting client is a suitable candidate for an application node that may be included within distributed computing system 10. In particular, discovery service 317 determines whether the client is a computing node of a type that may be automatically inventoried and integrated within distributed computing system 10. The requesting client may, for example, be a general-purpose computing device or a plurality of racked computing "blades" that may be well suited for autonomic control within distributed computing system 10. Alternatively, the requesting node may be a switch, router, printer, conventional workstation, laptop or other resource not suitable for operation within a distributed computing system having autonomic control.

In one embodiment, discovery service 317 determines whether the lease specifies information in a manner that matches one of a plurality of naming conventions used to identify candidate application nodes. This process may be vendor specific. For example, discovery service 317 may analyze certain substrings within the DHCP lease to identify candidate nodes. In one embodiment, discovery service 317 analyzes a vendor class identifier and a host name associated with the DHCP lease. As one example, a vendor class identifier of "DELL RAC" may indicate that client is a DELL RAC™ power controller from Dell Inc. of Round Rock, Tex. As another example, a host name in which the first two characters are "MM" may indicate the client is an IBM BladeCenter™ Management Module (MM) power controller from IBM Corp. of White Plains, N.Y. Similarly, a host name in which the first four characters are "ASMA" may indicate the client is an IBM RSAII power controller from IBM Corp.

If a match is detected, discovery service 317 identifies the network address that the DHCP server temporarily assigned (404). Discovery service 317 updates organizational model 21 to assign a permanent network address to the newly discovered node for use within distributed computing system 10 until the node is deployed and a software image is subsequently assigned to the node for execution (406).

Next, discovery service 317 determines if the discovered node is a single, stand-alone node or whether the node is actually a control node (e.g., a power controller) for a plurality of nodes (408). For example, the node may be a control node for a plurality of computing blades mounted within a hardware rack. When the discovered node is a control node for a plurality of nodes, discovery service 317 may query the control node to determine the total number of nodes and to determine an offset associated with each of the nodes for purposes of network addressing.

Discovery service 317 then determines a media access control (MAC) address of a boot interface for each of the nodes (410). In some applications, discovery service 317 need only query the power controller for the MAC addresses. In other applications, discovery service 317 may invoke the power controller associated with the discovered node to remotely power cycle the node. Discovery service 317 then remotely captures and parses textual configuration information produced by the cycled node on a console port. This textual configuration information is usually produced by a bios of the node. Discovery service 317 parses the textual information to extract the MAC address of a boot network adapter (NIC) for the node. In the event the discovered node is a control module for a plurality of nodes, discovery service 317 performs this process (e.g., in parallel) for each of the nodes to identify MAC addresses for respective boot interfaces of the nodes.

Discovery service 317 creates a node object within organization model 21 for each of the discovered nodes and updates the objects to store the MAC addresses for the nodes (412). For example, discovery service 317 may store the MAC address for the boot NIC, and a MAC address and port identifier for an associated control module in the event the node is one of a plurality of nodes associated with a control module. Finally, discovery service 317 allocates each of the nodes to discovered pool 11 where the nodes wait to be inventoried (414).

Figure 22:
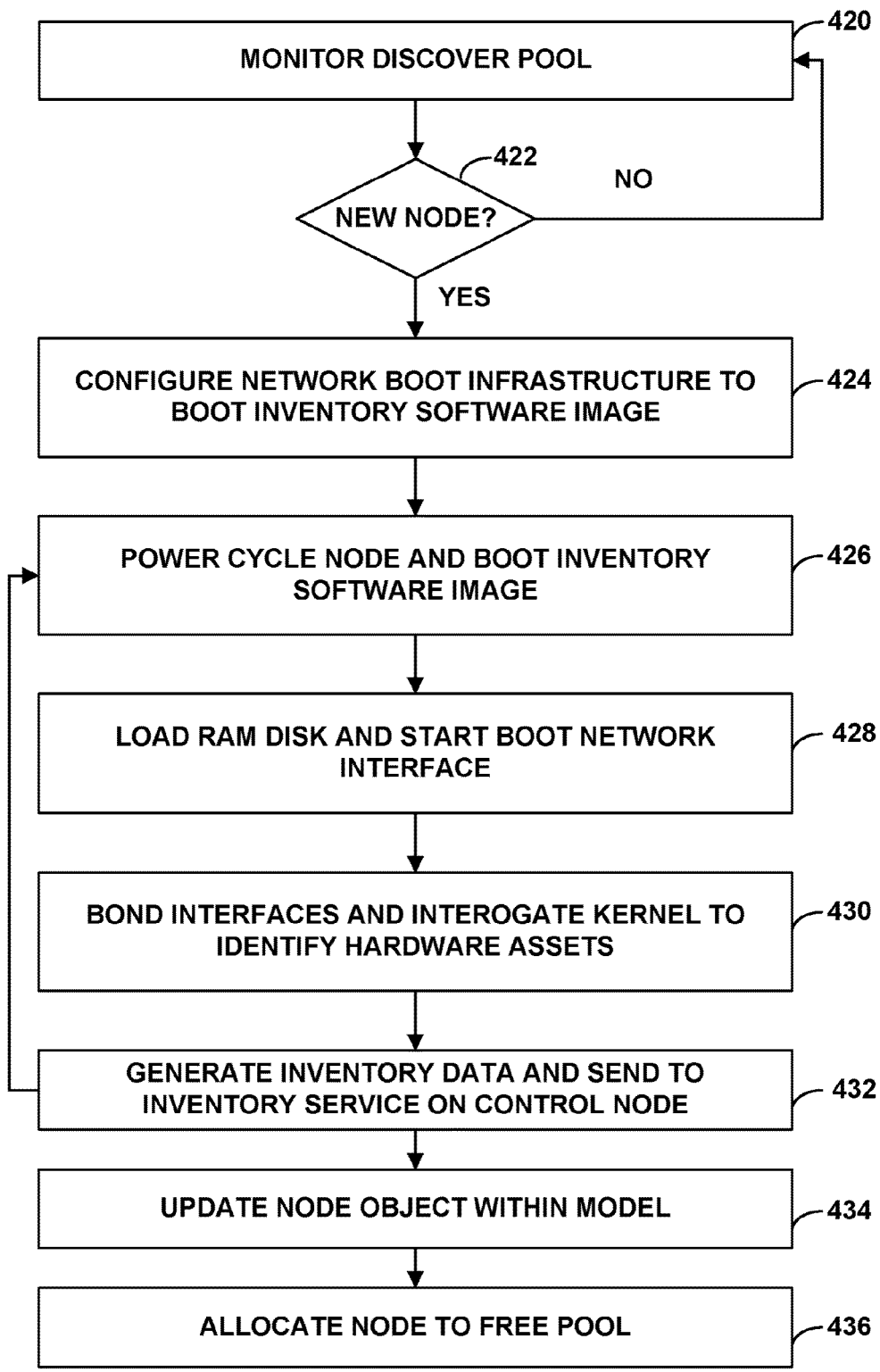
FIG. 22 is a flow diagram illustrating exemplary operation of an inventory service that automatically inventories hardware assets of a computing node.

FIG. 22 is a flow diagram illustrating exemplary operation of inventory service 319 when automatically inventorying attributes of a discovered computing node. In general, inventory service 319 monitors discovered pool 11 to detect the addition of newly discovered nodes (420). For example, BLT 206 may invoke inventory service 319 when discovery service 317 updates organizational model 21 to update a status of a node object to associate a node with discovered pool 11. Alternatively, a system administrator may interact with BLT 212 to manually invoke inventory service 319.

When inventory service 319 identifies a new node associated with discovered pool 11 (422), the inventory service configures a "pre-boot execution environment" (PXE) including a kernel, a RAM disk and a boot network interface for the node (424). In particular, inventory service 319 configures the PXE environment to network boot the node with a pre-defined "inventory software image" that is specialized for inventorying the hardware assets of the node.

Once the PXE environment is configured, inventory service 319 invokes a power controller associated with the node to power cycle the node and boot the node with the inventory software image (426). During the network boot process, the node loads the specified kernel and initializes the RAM disk and identified boot network interface that corresponds to the MAC address derived during the discovery process (428).

Once the node is booted, the node executes an inventory process (i.e., software module) of the inventory software image. This inventory process executes on the node, initializes all of the network interfaces of the node, and determines which of the interfaces can communicate with each other. The inventory process marks those interfaces that can communicate with each other as "bonded" (430). In addition, the inventory process executing on the node interrogates the kernel operating parameters (e.g., the "/proc" virtual file system in Linux) to identify hardware attributes for the node. Example attributes identified during the inventory process may include a processor architecture, a processor count, a processor speed, an amount of memory (e.g., RAM), local disk characteristics, disk partition information including size and name, whether HBA or other computing resources are present within the node, and other information.

The inventory process executing on the node generates inventory data that specifies all of the inventoried attributes of the node as well as which of the network interfaces of the node can be bonded. The inventory process may generate the inventory data in the form of a data file that conforms to a data description language, e.g., the extensible markup language (XML). The inventory process creates the inventory data and sends the inventory data from the node to inventory service 319 executing on control node 12 (432). After sending the inventory data, the inventory process terminates and the newly inventoried node waits for reboot and deployment within distributed computing system 10

Inventory service 319 receives the inventory data and automatically updates the node object within organizational model 21 to store the inventory data, i.e., the attributes for the node (434). Inventory service 319 then updates the node object to reassign the node from discovered pool 11 to free pool 13, thereby marking the node as ready for deployment (436). In the event the node is one of a plurality of nodes associated with a common control module, inventory service 319 performs this process (e.g., in parallel) for each of the nodes. In this manner, newly discovered nodes can be inventoried and readied for deployment within allocated pool 15.

Various embodiments of the invention have been described. These and other embodiments are within the scope of the following claims.

The invention claimed is:

1. A method comprising:
    storing a model within a database of a control node, wherein the model defines an organization of a distributed computing system having a plurality of computing nodes;
    automatically detecting an addition of a node to a network;
    upon detecting the addition of the node, network booting the detected node with an inventory software image that includes an executable inventory process for identifying hardware attributes of the detected node;
    executing the inventory process on the detected node to automatically identify the hardware attributes for the detected node and to send the identified hardware attributes from the detected node to the control node for storage within the model;
    updating the model to store the identified hardware attributes for the detected node; and
    automatically deploying the detected node within the distributed computing system in accordance with the model based on the identified hardware attributes and based on one or more requirements of a function assigned to the detected node, wherein automatically deploying the detected node comprises automatically loading a software image onto the detected node to provide a computing environment for execution of user software applications.

2. The method of claim 1, wherein detecting the node comprises:
    detecting automatic assignment of a temporary network address to the node; and
    analyzing the assignment to determine whether the node is a candidate for deployment as one of the computing nodes within the distributed computing system.

3. The method of claim 2, wherein analyzing the assignment comprises:
    parsing the assignment of the temporary network address to extract an identifier; and
    determining whether the identifier matches one of a set of known types of computing nodes.

4. The method of claim 1, further comprising:
    creating a node object within the model upon detecting the node; and
    updating the node object to store the attributes.

5. The method of claim 1, wherein detecting a node comprises:
    determining a media access controller (MAC) address for the detected node; and
    storing the MAC address within a node object of the model.

6. The method of claim 5, wherein determining the MAC address comprises:
    remotely cycling power on the detected node;
    remotely monitoring a console port of the detected node to capture textual configuration information while the detected node reboots; and
    parsing the textual configuration to extract the MAC address.

7. The method of claim 1, wherein network booting comprises:
    configuring a pre-boot execution environment to define the inventory software image to include the inventory process, an operating system kernel, a random access memory (RAM) disk, and a network interface.

8. The method of claim 1, wherein executing the inventory process on the detected node comprises:
    executing the inventory process on the detected node to identify a plurality of network interfaces on the detected node;
    determining which of the network interfaces can communicate with each other; and
    updating the model to mark the interfaces that can communicate with each other as bonded interfaces.

9. The method of claim 1, wherein executing the inventory process on the detected node comprises:
    executing the inventory process on the detected node to generate inventory data that conforms to a data description language; and
    sending the inventory data from the detected node to a control node of the distributed computing system.

10. A method comprising:
    storing a model within a database of a control node, wherein the model defines an organization of a distributed computing system having a plurality of computing nodes;
    automatically detecting an addition of a node to a network;
    upon detecting the addition of the node, network booting the detected node with an inventory software image that includes an executable inventory process for identifying hardware attributes of the detected node;
    executing the inventory process on the detected node to automatically identify the hardware attributes for the detected node and to send the identified hardware attributes from the detected node to the control node for storage within the model;
    updating the model to store the identified hardware attributes for the detected node;
    automatically deploying the detected node within the distributed computing system in accordance with the model based on the identified hardware attributes, wherein automatically deploying the detected node comprises automatically loading a software image onto the detected node to replace the inventory software image and provide a computing environment for execution of user software applications;
    determining whether the detected node is a control node for a plurality of nodes;
    creating a respective node object within the model for each of the plurality of the nodes;
    automatically identifying attributes for each of the plurality of nodes; and
    updating the node objects to store the attributes.

11. A method comprising:
    storing a model within a database of a control node, wherein the model defines an organization of a distributed computing system having a plurality of computing nodes;
    automatically detecting an addition of a node to a network;
    upon detecting the addition of the node, network booting the detected node with an inventory software image that includes an executable inventory process for identifying hardware attributes of the detected node;

executing the inventory process on the detected node to automatically identify the hardware attributes for the detected node and to send the identified hardware attributes from the detected node to the control node for storage within the model;

updating the model to store the identified hardware attributes for the detected node;

automatically deploying the detected node within the distributed computing system in accordance with the model based on the identified hardware attributes, wherein automatically deploying the detected node comprises automatically loading a software image onto the detected node to replace the inventory software image and provide a computing environment for execution of user software applications;

automatically updating the model to assign the detected node to a discovered pool upon detecting the node; and automatically updating the model to assign the detected node to a free pool upon identifying the attributes.

12. A method comprising:

storing a model within a database of a control node, wherein the model defines an organization of a distributed computing system having a plurality of computing nodes;

automatically detecting an addition of a node to a network;

upon detecting the addition of the node, network booting the detected node with an inventory software image that includes an executable inventory process for identifying hardware attributes of the detected node;

executing the inventory process on the detected node to automatically identify the hardware attributes for the detected node and to send the identified hardware attributes from the detected node to the control node for storage within the model;

updating the model to store the identified hardware attributes for the detected node;

automatically deploying the detected node within the distributed computing system in accordance with the model based on the identified hardware attributes, wherein automatically deploying the detected node comprises automatically loading a software image onto the detected node to replace the inventory software image and provide a computing environment for execution of user software applications;

receiving input that defines the model in a hierarchical form that includes a fabric having one or more domains, and wherein each domain has at least one tier that includes at least one node slot; and automatically configuring the distributed computing system in accordance with the model.

13. The method of claim 12, further comprising:

mapping software images associated with the computing functions to the node slots in accordance with the attributes;

assigning the computing nodes to the node slots of the tiers; and deploying the software images on the assigned computing nodes.

14. A computing system comprising:

a database that stores a model that defines an organization for the computing system; and a control node that detects an addition of a node to a network and automatically identifies hardware attributes for the detected node, wherein the network interconnects a plurality of application nodes, wherein the control node comprises an inventory service that network boots the detected node with an inventory software image when the control node detects the addition of the node, wherein the inventory software image primarily includes an executable inventory process for identifying hardware attributes of the detected node, wherein the inventory process executes on the detected node to automatically identify the hardware attributes for the detected node and sends the identified hardware attributes from the detected node to the control node for storage within the model, wherein the control node updates the model to store the identified hardware attributes for the detected node and automatically deploys the detected node within the computing system in accordance with the model based on the identified hardware and based on one or more requirements of a function assigned to the detected node, and automatically loads a software image onto the detected node to replace the inventory software image and provide a computing environment for execution of user software applications.

15. The computing system of claim 14, further comprising:

a dynamic host communication protocol (DHCP) server that assigns a temporary network address to the node, wherein the control unit comprises a discovery service that detects the assignment of the temporary network address and analyzes the assignment to determine whether the node is a candidate for a computing node to be deployed within the computing system.

16. The computing system of claim 15, wherein the discovery service parses the assignment made by the DHCP server to extract an identifier and determines whether the identifier matches one of a set of known types of computing nodes.

17. The computing system of claim 15, wherein the discovery service executing on the control node remotely cycles power on the detected node and monitors a console port of the detected node to capture textual configuration information when the detected node reboots, and wherein the discovery service parses the textual configuration to extract a media access control (MAC) address and stores the MAC address within the node object of the model.

18. The computing system of claim 14, wherein the inventory service configures a pre-boot execution environment to define the software image to include the inventory process, an operating system kernel, a random access memory (RAM) disk, and a network interface.

19. The computing system of claim 14, wherein the inventory process executes on the detected node to identify a plurality of network interfaces on the detected node, and wherein the inventory process determines which of the network interfaces can communicate with each other and marks the interfaces that can communicate with each other as bonded interfaces.

20. The computing system of claim 14, wherein the inventory process executes on the detected node to generate inventory data that conforms to a data description language, and wherein the inventory process sends the inventory data from the detected node to the control node for storage within the model.

21. A computing system comprising:

a database that stores a model that defines an organization for the computing system;

a control node that detects an addition of a node to a network and automatically identifies hardware attributes for the detected node, wherein the network interconnects a plurality of application nodes, wherein the control node comprises an inventory service that network boots the detected node with an inventory software image when the control node detects the addition of the node, wherein the inventory software image primarily includes an executable inventory process for identifying hardware attributes of the detected node, wherein the inventory process executes on the detected node to automatically identify the hardware attributes for the detected node and sends the identified hardware attributes from the detected node to the control node for storage within the model, wherein the control node updates the model to store the identified hardware attributes for the detected node and automatically deploys the detected node within the computing system in accordance with the model based on the identified hardware, and automatically loads a software image onto the detected node to replace the inventory software image and provide a computing environment for execution of user software applications; and wherein the discovery service determines whether the detected node is a control node for a plurality of nodes and creates a respective node object within the model for each of the plurality of the nodes, and wherein the discovery service automatically identifies attributes for each of the plurality of nodes and updates the node objects to store the attributes.

22. A computing system comprising:

a database that stores a model that defines an organization for the computing system;

a control node that detects an addition of a node to a network and automatically identifies hardware attributes for the detected node, wherein the network interconnects a plurality of application nodes, wherein the control node comprises an inventory service that network boots the detected node with an inventory software image when the control node detects the addition of the node, wherein the inventory software image primarily includes an executable inventory process for identifying hardware attributes of the detected node, wherein the inventory process executes on the detected node to automatically identify the hardware attributes for the detected node and sends the identified hardware attributes from the detected node to the control node for storage within the model, wherein the control node updates the model to store the identified hardware attributes for the detected node and automatically deploys the detected node within the computing system in accordance with the model based on the identified hardware, and automatically loads a software image onto the detected node to replace the inventory software image and provide a computing environment for execution of user software applications, and wherein the control unit comprises a discovery service that automatically detects the node and updates the model to add the node to a pool of discovered nodes, and wherein the inventory service automatically identifies the attributes and updates the model to assign the node from the pool of discovered nodes to a pool of free nodes available for deployment within the distributed computing system.

23. A non-transitory computer-readable medium comprising instructions that cause a processor to:

store a model within a database of a control node, wherein the model defines an organization of a distributed computing system having a plurality computing nodes;

automatically detect an addition of a node to a network;

network boot the detected node with an inventory software image upon detecting the addition of the node, wherein the inventory software image includes an executable inventory process for identifying hardware attributes of the detected node;

execute the inventory process on the detected node to automatically identify the hardware attributes for the detected node and to send the identified hardware attributes from the detected node to the control node for storage within the model;

update the model to store the identified hardware attributes for the detected node; and automatically deploy the detected node within the distributed computing system in accordance with the model based on the identified hardware attributes and based one or more requirements of a function assigned to the detected node, wherein the instructions that cause the processor to automatically deploy the detected node comprise instructions that cause the processor to automatically load a software image onto the detected node to replace the inventory software image and provide a computing environment for execution of user software applications.

24. The computer-readable medium of claim 23, wherein the instructions that cause the processor to execute the inventory process on the detected node comprise instructions that cause the processor to:

execute the inventory process on the detected node to identify a plurality of network interfaces on the detected node;

determine which of the network interfaces can communicate with each other; and update the model to mark the interfaces that can communicate with each other as bonded interfaces.

25. The computer-readable medium of claim 23, wherein the instructions that cause the processor to execute the inventory process on the detected node comprise instructions that cause the processor to:

execute the inventory process on the detected node to generate inventory data that conforms to a data description language; and send the inventory data from the detected node to a control node of the distributed computing system.

26. A computer program product comprising:

a non-transitory computer readable storage medium having computer readable program code embodied therewith, the computer readable program code comprising:

computer readable program code configured to store a model within a database of a control node, wherein the model defines an organization of a computing system having a plurality of computing nodes;

computer readable program code configured to automatically detect an addition of a node to a network;

computer readable program code configured to, upon detecting the addition of the node, network boot the detected node with an inventory software image that includes an executable inventory process for identifying hardware attributes of the detected node;

computer readable program code configured to execute the inventory process on the detected node to automatically identify the hardware attributes for the detected node and to send the identified hardware attributes from the detected node to the control node for storage within the model;

computer readable program code configured to update the model to store the identified hardware attributes for the detected node; and computer readable program code configured to automatically deploy the detected node within the computing system in accordance with the model based on the identified hardware attributes and based on one or more requirements of a function assigned to the detected node, wherein automatically deploying the detected node comprises automatically loading a software image onto the detected node to provide a computing environment for execution of user software applications.

27. The computer program product of claim 26, wherein:

the computer readable program code is operable to detect the node by:
- detecting automatic assignment of a temporary network address to the node; and
- analyzing the assignment to determine whether the node is a candidate for deployment as one of the computing nodes within the computing system; and wherein analyzing the assignment comprises:
- parsing the assignment of the temporary network address to extract an identifier; and
- determining whether the identifier matches one of a set of known types of computing nodes.

* * * * *

UNITED STATES PATENT AND TRADEMARK OFFICE
CERTIFICATE OF CORRECTION

PATENT NO. : 8,706,879 B2
APPLICATION NO. : 12/559310
DATED : April 22, 2014
INVENTOR(S) : J. Sparks Page 1 of 1

It is certified that error appears in the above-identified patent and that said Letters Patent is hereby corrected as shown below:

In the Claims

Column 27, line 64 (claim 22, line 33), please change "the distributed computing" to
-- the computing --
Column 28, line 3 (claim 23, line 5), please change "plurality computing" to
-- plurality of computing --
Column 28, lines 21, 22 (claim 23, line 21), please change "based one or" to
-- based on one or --

Signed and Sealed this
Sixth Day of January, 2015

Michelle K. Lee
*Deputy Director of the United States Patent and Trademark Office*